United States Patent
Rabnawaz

(10) Patent No.: US 11,135,617 B2
(45) Date of Patent: *Oct. 5, 2021

(54) OMNIPHOBICALLY COATED FLUID CHANNELS AND RELATED METHODS

(71) Applicant: BOARD OF TRUSTEES OF MICHIGAN STATE UNIVERSITY, East Lansing, MI (US)

(72) Inventor: Muhammad Rabnawaz, East Lansing, MI (US)

(73) Assignee: BOARD OF TRUSTEES OF MICHIGAN STATE UNIVERSITY, East Lansing, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/962,388

(22) PCT Filed: Feb. 11, 2020

(86) PCT No.: PCT/US2020/017599
§ 371 (c)(1),
(2) Date: Jul. 15, 2020

(87) PCT Pub. No.: WO2020/167714
PCT Pub. Date: Aug. 20, 2020

(65) Prior Publication Data
US 2020/0398309 A1 Dec. 24, 2020

Related U.S. Application Data

(60) Provisional application No. 62/804,983, filed on Feb. 13, 2019.

(51) Int. Cl.
*B05D 5/08* (2006.01)
*C08L 75/04* (2006.01)
(Continued)

(52) U.S. Cl.
CPC ............ *B05D 5/08* (2013.01); *B05D 3/102* (2013.01); *B05D 3/108* (2013.01); *B05D 7/14* (2013.01);
(Continued)

(58) Field of Classification Search
None
See application file for complete search history.

(56) References Cited

U.S. PATENT DOCUMENTS 10,245,355 B2 * 4/2019 Ingber ............... A61L 27/34
10,619,057 B2 * 4/2020 Nowak .............. C08G 18/4833
(Continued)

FOREIGN PATENT DOCUMENTS

WO WO-2019/199713 A1 10/2019
WO WO-2020/041409 A1 2/2020
(Continued)

OTHER PUBLICATIONS

International Application No. PCT/US2018/061189, International Search Report and Written Opinion, dated May 12, 2020.
(Continued)

*Primary Examiner* — Tae H Yoon
(74) *Attorney, Agent, or Firm* — Marshall, Gerstein & Borun LLP

(57) ABSTRACT

The disclosure relates to an omniphobically coated fluid channel including a channel defining an interior channel surface and a flow volume, and a thermoset omniphobic composition as a coating on the interior channel surface. The thermoset omniphobic composition (such as an omniphobic polyurethane or epoxy composition) includes a thermoset polymer with first, second, and third backbone segments. The first, second, and third backbone segments can correspond to urethane or urea reaction products of polyisocyanate(s), amine-functional omniphobic polymer(s), and poly-
(Continued)

ol(s), respectively, for omniphobic polyurethanes. Similarly, the first, second, and third backbone segments can correspond to urea or beta-hydroxy amine reaction products of polyamine(s), isocyanate-functional omniphobic polymer(s), and polyepoxide(s), respectively, for omniphobic epoxies. The thermoset omniphobic composition coating protects the underlying channel material (such as metal material) from corrosion, and it can further reduce the pressure drop of fluid flowing through the channel. The omniphobically coated fluid channel can be used as a component of a heat transfer apparatus.

52 Claims, 4 Drawing Sheets

(51) Int. Cl.
| | |
|---|---|
| C08G 18/10 | (2006.01) |
| C08G 18/24 | (2006.01) |
| C08G 18/32 | (2006.01) |
| C08G 18/48 | (2006.01) |
| C08G 77/26 | (2006.01) |
| C08G 77/458 | (2006.01) |
| C08G 77/46 | (2006.01) |
| C09D 175/04 | (2006.01) |
| B05D 7/14 | (2006.01) |
| C09D 163/00 | (2006.01) |
| B05D 3/10 | (2006.01) |

(52) U.S. Cl.
CPC ........... *C08G 18/10* (2013.01); *C08G 18/244* (2013.01); *C08G 18/3206* (2013.01); *C08G 18/4829* (2013.01); *C08G 77/26* (2013.01); *C08G 77/458* (2013.01); *C08G 77/46* (2013.01); *C08L 75/04* (2013.01); *C09D 163/00* (2013.01); *C09D 175/04* (2013.01); *B05D 2503/00* (2013.01); *C08L 2312/00* (2013.01)

(56) References Cited

U.S. PATENT DOCUMENTS

| | | |
|---|---|---|
| 2004/0192835 A1 | 9/2004 | Steidl et al. |
| 2005/0148752 A1 | 7/2005 | Klaassens et al. |
| 2015/0132742 A1 | 5/2015 | Thuo et al. |
| 2016/0200937 A1 | 7/2016 | Hu et al. |
| 2018/0355189 A1 | 12/2018 | Huang et al. |
| 2020/0048459 A1 | 2/2020 | Rabnawaz |
| 2020/0347179 A1 | 11/2020 | Rabnawaz et al. |

FOREIGN PATENT DOCUMENTS

| | | |
|---|---|---|
| WO | WO-2020/142578 A1 | 7/2020 |
| WO | WO-2020/160089 A1 | 8/2020 |
| WO | WO-2020/180760 A1 | 9/2020 |

OTHER PUBLICATIONS

U.S. Appl. No. 16/486,902, Rabnawaz et al., Methods for Forming Omniphobic Thermoset Compositions and Related Articles, filed Aug. 19, 2019.

\* cited by examiner

OMNIPHOBICALLY COATED FLUID CHANNELS AND RELATED METHODS

CROSS-REFERENCE TO RELATED APPLICATIONS

This is a National Stage of International Application No. PCT/US2020/017599, filed Feb. 11, 2020, which claims the benefit of U.S. Provisional Application No. 62/804,983 (filed Feb. 13, 2019), which is incorporated herein by reference in its entirety.

STATEMENT OF GOVERNMENT INTEREST

None.

BACKGROUND OF THE DISCLOSURE

Field of the Disclosure

The disclosure relates to an omniphobically coated fluid channel including a channel defining an interior channel surface and a flow volume, and a thermoset omniphobic composition as a coating on the interior channel surface. The thermoset omniphobic composition includes a thermoset polymer with first, second, and third backbone segments, for example in as an omniphobic polyurethane or epoxy composition. The thermoset omniphobic composition coating protects the underlying channel material (such as metal material) from corrosion, and it can further reduce the pressure drop of fluid flowing through the channel. The omniphobically coated fluid channel can be used as a component of a heat transfer apparatus.

Brief Description of Related Technology

When water accumulates on a surface, the surface energy of the material is directly related to how the water will react. Some surfaces may allow the water to spread out into a pool with a large surface area, whereas others may make water bead up into droplets. The contact angle between the water droplet and the surface is used to characterize the surface into three categories: hydrophilic (<90°), hydrophobic)(90°-150°, and superhydrophobic)(>150°. FIG. 1 is a visual representation of a contact angle measurement.

Hydrophobicity can be achieved in two ways: controlling the chemical interactions between water and the material surface or altering the surface of the material. Generally, non-polar molecular groups are responsible water beading on a surface as opposed to spreading, due to the lower surface energies exhibited by non-polar groups. A lower surface energy of the material will directly relate to a high contact angle. In contrast, high-energy materials will cause water to spread out in a thin pool, as the polar groups present in surfaces with high energies attract the polar water molecules.

Physically altering the surface (e.g., increasing the roughness thereof) of the material may also increase the hydrophobicity of a material. By creating pillars or other similar features on a textured surface, water interacts with an increased surface area on the material, thus amplifying the chemical interactions between water and the surface. An image depicting how texturing the surface leads to increased contact angle can be seen below in FIG. 2.

A material that repels oils is known as oleophobic or lipophobic depending on if the repelling action is a physical or chemical property, respectively, and operates analogously to hydrophobic materials. These materials are often used on touch screen displays so that bodily oils and sweat gland secretions do not build up on the surface of a screen. A material that exhibits both hydrophobic and oleophobic properties is known as omniphobic. Such materials with very high contact angles are often regarded as "self-cleaning" materials, as contaminants will typically bead up and roll off the surface. As such, these materials have possible applications in screen display, window, and building material coatings.

Hu et al. U.S. Publication No. 2016/0200937 discloses polyurethane-based and epoxy-based compositions that be used as coatings and adhesives with abrasion-resistant, ink-resistant, anti-graffiti, anti-fingerprint properties. The disclosed process for making the compositions requires graft and block copolymer components along with a two-step/two-pot manufacturing process, increasing the time to manufacture and cost of the product.

SUMMARY

In one aspect, the disclosure relates to an omniphobically coated fluid channel comprising: a channel comprising at least one sidewall defining an interior channel surface and a flow volume, wherein the channel is adapted to permit fluid flow through the flow volume (e.g., water, aqueous mixture, or other fluid flow); and a thermoset omniphobic composition as a coating on the interior channel surface. The channel can be a tube, conduit, etc., and it can include a single sidewall (e.g., for a circular or other round tube), four sidewalls for a square or other rectangular channel, etc. The thermoset omniphobic composition can be adhered or otherwise bound to the channel surface, such as directly thereon or with an intermediate layer. The thermoset omniphobic composition comprises: a thermoset polymer comprising a crosslinked backbone, the crosslinked backbone comprising: (i) first backbone segments having a structure corresponding to a reaction product from at least one first thermosetting component reactive with at least one of a second thermosetting component and a functionalized omniphobic polymer having a glass transition temperature ($T_g$) of 70° C. or less, (ii) second backbone segments having a structure corresponding to a reaction product from at least one first thermosetting component reactive with at least one of a second thermosetting component and a functionalized omniphobic polymer having a glass transition temperature ($T_g$) of 70° C. or less, (iii) third backbone segments having a structure corresponding to a reaction product from at least one second thermosetting component reactive with the first thermosetting component, (iv) first linking groups linking the first backbone segments and the third backbone segments, and (v) second linking groups linking the first backbone segments and the second backbone segments.

In a particular refinement, the thermoset omniphobic composition can comprise: a thermoset polymer comprising a crosslinked backbone, the crosslinked backbone comprising: (i) first backbone segments, (ii) second backbone segments, (iii) third backbone segments, (iv) first linking groups linking the first backbone segments and the third backbone segments, and (v) second linking groups linking the first backbone segments and the second backbone segments. The first backbone segments have a structure corresponding to a (polymerization) reaction product (e.g., polymerization reaction product when incorporated into the thermoset network) from at least one first thermosetting component (e.g., monomer, comonomer, prepolymer, oligomer, polymer with 2+ polymerizable functional groups) reactive with at least one of a second thermosetting component and a functionalized omniphobic polymer having a glass transition temperature ($T_g$) of 70° C. or 50° C. or less. The second backbone segments have a structure corresponding to a (polymerization) reaction product from at least one functionalized omniphobic polymer having a glass transition temperature ($T_g$) of 70° C. or 50° C. or less, the functionalized omniphobic polymer being reactive with the first thermosetting component (e.g., having a functional group such as an epoxide group, amino group, hydroxyl group, isocyanate group, or carboxylic group). The functionalized omniphobic polymer can be a "polymerization reaction product" when incorporated into the thermoset network or a "reaction product" when a monofunctional functionalized omniphobic polymer is incorporated as a pendant or terminal chain in the thermoset network. The third backbone segments have a structure corresponding to a (polymerization) reaction product (e.g., polymerization reaction product when incorporated into the thermoset network) from at least one second thermosetting component (e.g., monomer, comonomer, prepolymer, oligomer, polymer with 2+ polymerizable functional groups) reactive with the first thermosetting component. The first linking groups have a structure corresponding to a reaction product of a first functional group of the first thermosetting component and a second functional group of the second thermosetting component. The second linking groups have a structure corresponding to a reaction product of the first functional group of the first thermosetting component and a third functional group of the functionalized omniphobic polymer. The first functional group, the second functional group, and the third functional group are different from each other (e.g., isocyanate, hydroxy, and amino, respectively, for polyurethane with amino-PDMS; amino, isocyanate, and epoxide, respectively for polyurea resin with epoxy-PDMS; amino, epoxide, and isocyanate respectively for epoxy resin with isocyanate-PDMS). In some embodiments, the first and third functional groups have a higher reaction rate with each other relative to the first and second functional groups with each other (e.g., under the same reaction/curing conditions; second and third groups can be generally non-reactive). The thermoset omniphobic composition generally has a homogeneous structure, for example a homogenous thermoset solid with the first, second, and third backbone segments being generally evenly distributed throughout the composition (e.g., in contrast to a "self-stratified" structure with a siloxane (or other omniphobic polymer group) rich surface and bulk thermoset region with little or no siloxane (or other omniphobic polymer group)). The second backbone segments are present in an amount ranging from 0.01 wt. % to 20 wt. % (e.g., 0.2-8 wt. % or 1-5 wt. % more preferably) relative to the thermoset polymer.

Various refinements of the disclosed omniphobically coated fluid channel and related thermoset omniphobic composition are possible.

In a refinement, the channel comprises a metal. The channel can be formed from or otherwise contain one or more metals, in particular the sidewall structure in proximity with fluid flowing through the channel. In a further refinement, the metal can be selected from aluminum, copper (e.g., bronze alloy with tin, brass alloy with zinc), steel (e.g., stainless steel), cast iron (e.g., including 96-98 wt. % iron, 2-4 wt. % carbon, silicon), alloys thereof, and combinations thereof. The channel more generally can be formed from or otherwise contain one or more materials subject to corrosion or other degradation with prolonged contact to a liquid, for example water. In other embodiments, the channel can comprise a non-metal, for example being formed from or otherwise containing one or more non-metals such as plastic or polymer materials (e.g., polyvinyl chloride), ceramic materials, glass materials, etc. Regardless of the type of channel material (e.g., metal or non-metal) and its potential susceptibility to corrosion (e.g., in the case of metals/alloys), the omniphobic coatings can be further useful to reduce the pressure drop/energy cost for pumping fluid through the channels with a low-friction inner surface, which can be particularly useful for viscous fluids (e.g., oils such as crude oil).

In a refinement, the thermoset omniphobic composition has a thickness ranging from 0.01 μm to 100 μm or 500 μm, in particular from 10 μm to 50 μm. More generally, the thermoset omniphobic coating can have any desired thickness on the substrate. In common applications, the coating has a thickness ranging from 0.010 μm to 100 μm or 500 μm, for example at least 0.01, 10, 20, 50, or 100 μm and/or up to 200, 500 μm. Typical cast coatings can have thicknesses of 10 μm to 50 μm or 100 μm. Typical spin coatings can have thicknesses of 0.05 μm or 0.10 μm to 0.20 μm or 0.50 μm. Multiple coating layers can be applied to substrate to form even thicker layers of the composition (e.g., above 500 μm or otherwise) if desired.

In a refinement, the channel has a characteristic length dimension perpendicular to a direction of flow through the flow volume (e.g., channel circular diameter, square width) in a range from 0.2 cm to 200 cm. For example, the characteristic length can be at least 0.2, 0.3, 0.5, 1, 2, 5, 7, 10, or 20 cm and/or up to 5, 10, 20, 25, 30, 40, 50, 70, 100, 150, or 200 cm.

In a refinement, the first linking groups have a structure corresponding to a reaction product of a first functional group of the first thermosetting component and a second functional group of the second thermosetting component, and the second linking groups have a structure corresponding to a reaction product of the first functional group of the first thermosetting component and a third functional group of the functionalized omniphobic polymer.

In a refinement, the first functional group, the second functional group, and the third functional group are different from each other. In a further refinement, the first and third functional groups have a higher reaction rate with each other relative to the first and second functional groups with each other.

In a refinement, the thermoset omniphobic composition has a homogeneous structure.

In a refinement, the thermoset omniphobic composition has a heterogeneous structure, for example a composite structure with one or more additives or nanofillers distributed throughout the thermoset omniphobic composition.

In a refinement, the second backbone segments are present in an amount ranging from 0.01 wt. % to 20 wt. % or 40 wt. % relative to the thermoset polymer.

In a refinement, the functional group of the functionalized omniphobic polymer is selected from the group consisting of epoxide groups, amino groups, isocyanate groups, hydroxyl groups, carboxylic groups, isocyanate groups, and combinations thereof (e.g., for multifunctional functionalized omniphobic polymers). Several specific functionalized omniphobic polymer functional groups and their complementary groups in the first thermosetting component are illustrated as follows. Isocyanate groups in the functionalized omniphobic polymer can react with amino groups of the first thermosetting component to make a urea linkage, such as in an epoxy thermosets. Amino groups in the functionalized omniphobic polymer can react with isocyanate groups in the first thermosetting component to make a urea link, such as in a polyurethane thermoset. Amino groups in the functionalized omniphobic polymer can react with epoxide groups in the first thermosetting component to make beta-hydroxy tertiary amine links, such as in an epoxy thermoset. Amino groups in the functionalized omniphobic polymer can react with carboxylic groups in the first thermosetting component to make an amide link, such as in an acrylic thermoset. Amino groups in the functionalized omniphobic polymer can react with isocyanate groups of the first thermosetting component to make a urea linkage, such as in an epoxy thermoset. Amino groups in the functionalized omniphobic polymer can react with isocyanate groups of the first thermosetting component to make a urea linkage, such as in an epoxy thermoset cured with anhydrides having added isocyanate groups to the anhydride monomer units. Epoxide groups in the functionalized omniphobic polymer can react with amino groups in the first thermosetting component to make beta-hydroxy tertiary amine links, such as in an epoxy thermoset. Hydroxyl groups in the functionalized omniphobic polymer can react with isocyanate groups in the first thermosetting component to make a urethane link, such as in a polyurethane thermoset. Hydroxyl groups in the functionalized omniphobic polymer can react with carboxylic groups in the first thermosetting component to make an ester link, such as in an acrylic thermoset. Carboxylic groups in the functionalized omniphobic polymer can react with hydroxyl groups in the first thermosetting component to make an ester link, such as in a polyurethane thermoset. Carboxylic groups in the functionalized omniphobic polymer can react with amino groups in the first thermosetting component to make an amide link, such as in an epoxy thermoset.

In a refinement, the functionalized omniphobic polymer is selected from the group consisting of functionalized polysiloxanes, functionalized polyperfluoroethers, functionalized polybutadienes, functionalized polyisobutenes ("PIB"), functionalized branched polyolefins, functionalized low molecular weight polyolefins, functionalized poly(meth)acrylates (e.g., also including $C_2$-$C_{16}$ pendant alkyl groups), and combinations thereof. In a further refinement, the functionalized omniphobic polymer can be used in combination with a low melting point (e.g., melting point from 0-60° C.) hydrophilic polymer/oligomer such as amine-functional poly(ethylene glycol) methyl ether ("PEO").

In a refinement, the functionalized omniphobic polymer comprises a mono-functional functionalized omniphobic polymer (e.g., having only a single functional group reactive with the first thermosetting component, such as at a terminal location of the omniphobic polymer; such as a mono-functional polysiloxane).

In a refinement, the functionalized omniphobic polymer comprises a di-functional functionalized omniphobic polymer (e.g., having only two functional groups reactive with the first thermosetting component, such as at terminal locations of the omniphobic polymer; such as a di-functional polysiloxane).

In a refinement, the functionalized omniphobic polymer comprises a poly-functional functionalized omniphobic polymer (e.g., having three, four, or more functional groups reactive with the first thermosetting component, such as at terminal locations of the omniphobic polymer and/or as pendant groups along the backbone of the omniphobic polymer; such as a poly-functional polysiloxane).

In a refinement, the functionalized omniphobic polymer is a liquid at a temperature in a range from −150° C. to 70° C., −150° C. to 50° C., or from −130° C. to 40° C. In various embodiments, the functionalized omniphobic polymer is a liquid at a temperature in a range from 10° C. to 40° C. (e.g., from 20° C. to 30° C., or about room temperature, such as where the functionalized omniphobic polymer has a melting temperature (Tm) below 10° C. or 20° C.). The third functional groups of the functionalized omniphobic polymer can be terminal and/or pendant from the polymer.

In a refinement, the functionalized omniphobic polymer has a molecular weight ranging from 300 to 50,000 g/mol. The functionalized omniphobic polymer can have any suitable molecular weight in view of desired glass transition temperature, for example having a molecular weight ranging from 300 to 50,000 g/mol. In various embodiment, the molecular weight can be at least 300, 800, 1000, 1500, or 2000 and/or up to 1000, 2000, 3000, 5000, or 50,000 g/mol. The molecular weight can be expressed as a number-average or weight-average value in the units of gram/mole (g/mol). Some embodiments can include a blend of two or more functionalized omniphobic polymers with different average molecular weights, such as one with 300-1500 g/mol and another with 1500-50,000 g/mol with a higher average molecular weight than the first. Blends of functionalized omniphobic polymers (e.g., differing in molecular weight and/or in degree of functionality) can improve the combination of water- and oil-repellency properties of the final composition. For example, a mono-functionalized polysiloxane can provide better water and oil repellency than a di-functionalized polysiloxane. Low MW functionalized polysiloxanes (e.g., PDMS, such as having a MW range of about 800-1200 g/mol or an average MW of about 1000 g/mol) can provide an improved water repellency, while Higher MW functionalized polysiloxanes (e.g., PDMS, such as about 2000 g/mol or above for an average or range of MW) can provide an improved oil repellency.

In a refinement, the first thermosetting component and the second thermosetting component together correspond to a thermoset polyurethane. For example, the first and second thermosetting components can include at least one polyisocyanate and at least one polyol, where at least one component is reactive with the functional group of the functionalized omniphobic polymer.

In a refinement, the first thermosetting component comprises a polyisocyanate or a polyol; and the second thermosetting component comprises the other of the polyisocyanate and the polyol. The polyisocyanate can be di-, tri-, or higher functional such as a diisocyanate, triisocyanate, blend of multiple polyisocyanates with same or different functionality. The polyol can be di-, tri-, or higher functional such as a diol, triol, blend of multiple polyols with same or different functionality. At least one polyisocyanate or polyol has a functionality greater than two for crosslinking.

The "first" and "second" labels for the thermosetting components are interchangeable with respect to their ability to react with each other and form a crosslinked, thermoset network portion of the final thermoset polymer, which in the case of a polyisocyanate/polyol combination corresponds to a urethane linking group as the first linking group L1. The distinction is that the first functional group of the first thermosetting component is also capable of reacting with the third functional group of the functionalized omniphobic polymer, while the second functional group of the second thermosetting component could (but need not) also be capable of reacting with the third functional group of the functionalized omniphobic polymer. In some embodiments, the first and third functional groups have a higher reaction rate with each other relative to the first and second functional groups with each other. In some embodiments, the second and third functional groups do not (substantially) react with each other. For example, the polyisocyanate can be first thermosetting component when the functionalized omniphobic polymer has an isocyanate-reactive functional group (e.g., such as an amino group to form a urea group as the second linking group L2, or such as a hydroxyl group for form a urethane group as second linking group L2), in which case the polyol can be the second thermosetting component and need not react (or be unable to react) with the functionalized omniphobic polymer. Similarly, the polyol can be first thermosetting component when the functionalized omniphobic polymer has a hydroxyl-reactive functional group (e.g., such as a carboxylic group to form an ester group as the second linking group L2), in which case the polyisocyanate can be the second thermosetting component and need not react (or be unable to react) with the functionalized omniphobic polymer.

In a further refinement, the first thermosetting component comprises the polyisocyanate, and the first functional group of the first thermosetting component comprises an isocyanate group; the second thermosetting component comprises the polyol, and the second functional group of the second thermosetting component comprises a hydroxyl group; and the third functional group of the functionalized omniphobic polymer comprises an amino group (e.g., PDMS-NH$_2$) or a hydroxyl group (e.g., PDMS-OH).

In a further refinement, the polyisocyanate is selected from the group consisting of 1,5-naphthylene diisocyanate, 4,4'-diphenylmethane diisocyanate (MDI), hydrogenated MDI, xylene diisocyanate (XDI), tetramethylxylol diisocyanate (TMXDI), 4,4'-diphenyl-dimethylmethane diisocyanate, di- and tetraalkyl-diphenylmethane diisocyanate, 4,4'-dibenzyl diisocyanate, 1,3-phenylene diisocyanate, 1,4-phenylene diisocyanate, one or more isomers of tolylene diisocyanate (TDI), 1-methyl-2,4-diiso-cyanatocyclohexane, 1,6-diisocyanato-2,2,4-trimethyl-hexane, 1,6-diisocyanato-2,4,4-trimethylhexane, 1-iso-cyanatomethyl-3-isocyanato-1,5,5-trimethylcyclohexane, chlorinated and brominated diisocyanates, phosphorus-containing diisocyanates, 4,4'-diisocyanatophenyl-perfluoroethane, tetramethoxybutane 1,4-diisocyanate, butane 1,4-diisocyanate, hexane 1,6-diisocyanate (HDI), HDI dimer (HDID), HDI trimer (HDIT), HDI biuret, 1,5-pentamethylene diisocyanate (PDI), PDID (dimer of PDI), PDIT (trimer of PDI), PDI biuret, dicyclohexylmethane diisocyanate, cyclohexane 1,4-diisocyanate, ethylene diisocyanate, phthalic acid bisisocyanatoethyl ester, 1-chloromethylphenyl 2,4-diisocyanate, 1-bromomethylphenyl 2,6-diisocyanate, 3,3-bischloromethyl ether 4,4'-diphenyldiisocyanate, trimethylhexamethylene diisocyanate, 1,4-diisocyanato-butane, 1,2-diisocyanatododecane, a polyurethane prepolymer diisocyanate, and combinations thereof. More generally, the polyisocyanate can be petrochemical or biobased, for example being derived from a petrochemical hydrocarbon feedstock or a biobased biomass feedstock.

In a particular refinement, the polyisocyanate comprises a polyurethane prepolymer diisocyanate. The polyurethane prepolymer diisocyanate can be a (linear) polyurethane prepolymer with two terminal isocyanate groups at opposing ends. The polyurethane prepolymer suitably includes polyether backbone segments (e.g., polytetrahydrofuran segments, ethylene oxide segments) to provide flexibility. The polyurethane prepolymer diisocyanate can be a reaction product between a polyether diol of the general formula HO((CH$_2$)$_m$O)$_n$H, where n can be from 2 to 20, 4 to 16, or 6 to 12 and m can be 2 to 8, 2 to 4, or 2, and a diisocyanate (e.g., hexane 1,6-diisocyanate (HDI) or others as noted above) in sufficient amount to react with both diol hydroxy groups, thus providing two terminal isocyanate groups and two urethane groups per prepolymer unit. The polyisocyanate prepolymers can include those with a sub-ambient glass transition temperature (T$_g$) (e.g., 0-40° C. or 10-30° C.) or with an above-ambient T$_g$ (e.g., 30-150° C. or 40-120° C.). The polyisocyanate prepolymers suitably have an Mw ranging from about 500-10000 g/mol.

In a further refinement, the polyol is selected from the group consisting of polyether polyols, hydroxlated (meth) acrylate oligomers, glycerol, ethylene glycol, diethylene glycol, triethylene glycol, tetraethylene glycol, propylene glycol, dipropylene glycol, tripropylene glycol, 1,3-propanediol, 1,3-butanediol, 1,4-butanediol, neopentyl glycol, 1,6-hexanediol, 1,4-cyclohexanedimethanol, glycerol, trimethylolpropane, 1,2,6-hexanetriol, pentaerythritol, (meth) acrylic polyols, isosorbide, and combinations thereof. More generally, the polyol can be petrochemical or biobased, for example being derived from a petrochemical hydrocarbon feedstock or a biobased biomass feedstock. Additionally, the polyols can be chosen from (meth)acrylic, polyesters, polycarbonates, polyethers, or a combination thereof.

In a refinement, the first thermosetting component and the second thermosetting component together correspond to a thermoset epoxy. For example, the first and second thermosetting components can include at least one polyepoxide and at least one amine (monoamine or polyamine) or anhydride (e.g., forming a beta-hydroxy ester reaction product link, such as at high reaction temperatures), where at least one component is reactive with the third functional group of the functionalized omniphobic polymer.

In a refinement, the first thermosetting component comprises a polyepoxide or an amine/amide; and the second thermosetting component comprises the other of the polyepoxide and the amine/amide. The polyepoxide can be di-, tri-, or higher functional such as a diepoxide, triepoxide, blend of multiple polyisocyanates with same or different functionality. The amine can be mono-, di-, tri-, or higher functional such as a monoamine, diamine, triamine, blend of multiple amines with same or different functionality. At least one polyepoxide has a functionality greater than two or at least one amine has a functionality greater than one for crosslinking (i.e., since a single —NH$_2$ primary amino group can react with two epoxide groups, either some species with three or more epoxide groups or two or more amino groups (which can form four or more bonds with epoxides) are used for crosslinking). Typically a diepoxide and a diamine are used.

The "first" and "second" labels for the thermosetting components are interchangeable with respect to their ability to react with each other and form a crosslinked, thermoset network portion of the final thermoset polymer, which in the case of a polyepoxide/amine combination corresponds to a beta-hydroxy (tertiary) amine linking group as the first linking group L1. The term "beta-hydroxy amine" generally refers a structure in which the hydroxy group is attached to the beta carbon, which is attached to the alpha-carbon, which is directly attached to the nitrogen atom of the reacted amine. The beta-hydroxy amine can be represented by the structure —CH(OH)—CH$_2$—NR$_1$R$_2$ in the cured epoxy thermoset, where R$_1$ and R$_2$ can be another beta-hydroxy group or the remainder of the amine thermosetting component. The distinction is that the first functional group of the first thermosetting component is also capable of reacting with the third functional group of the functionalized omniphobic polymer, while the second functional group of the second thermosetting component could (but need not) also be capable of reacting with the third functional group of the functionalized omniphobic polymer. In some embodiments, the first and third functional groups have a higher reaction rate with each other relative to the first and second functional groups with each other. In some embodiments, the second and third functional groups do not (substantially) react with each other. For example, the polyepoxide can be first thermosetting component when the functionalized omniphobic polymer has an epoxide-reactive functional group (e.g., such as an amino group to form a beta-hydroxy amine group as the second linking group L2), in which case the amine can be the second thermosetting component and need not react (or be unable to react) with the functionalized omniphobic polymer. Similarly, the amine can be first thermosetting component when the functionalized omniphobic polymer has an amine-reactive functional group (e.g., such as an isocyanate group to form a urea group as the second linking group, such as an epoxide group to form a beta-hydroxy amine group as the second linking group, such as a carboxylic acid group to form an amide group as the second linking group L2), in which case the polyepoxide can be the second thermosetting component and need not react (or be unable to react) with the functionalized omniphobic polymer.

In a further refinement, the first thermosetting component comprises the amine or amide, and the first functional group of the first thermosetting component comprises an amino group or amide group (e.g., where amides also can react with epoxy groups); the second thermosetting component comprises the polyepoxide, and the second functional group of the second thermosetting component comprises an epoxide group; and the third functional group of the functionalized omniphobic polymer comprises an isocyanate group. In a further refinement, the third functional group of the functionalized omniphobic polymer alternatively or additionally can comprise an epoxide group reactive with the amino group of the first thermosetting component (e.g., thus forming a component of an epoxy thermoset).

In a further refinement, the polyepoxide is selected from the group consisting of polyepoxide-substituted aromatic hydrocarbons, aliphatic hydrocarbons, cycloaliphatic hydrocarbons, ethers thereof, esters thereof, imines thereof, and combinations thereof. The polyepoxide can include hydrocarbons with two or more epoxide groups and one or more aromatic, aliphatic, cycloaliphatic, ether, ester, and/or imine groups in the hydrocarbon to which the epoxide groups are attached.

In a further refinement, the amine is selected from the group consisting of polyamine-substituted aromatic hydrocarbons, aliphatic hydrocarbons, cycloaliphatic hydrocarbons, ethers thereof, esters thereof, imines thereof, and combinations thereof. The amine can include hydrocarbons with two or more amino groups and one or more aromatic, aliphatic, cycloaliphatic, ether, ester, and/or imine groups in the hydrocarbon to which the amino groups are attached.

In a refinement, the first thermosetting component and the second thermosetting component together correspond to an acrylic thermoset. An acrylic thermoset can include acrylic or methacrylic oligomer or polymer chains having grafted (e.g., randomly, statistically, gradiently or blockwise) reactive groups, such as carboxylic, carboaxmide, hydroxyl, acrylic double bond, and/or epoxide groups. These groups can react with themselves or with co-reactants. Examples include carboxyl-diepoxides, hydroxyl-epoxy and urea or melamine condensation products, alkoxymethyl carboxamide-self-reactive, epoxy, alkyd, functional vinyl, allylic double bond-peroxide catalyzed, and allylic double bond-peroxide catalyzed grafted reactive groups.

In a refinement, the first backbone segments are present in an amount ranging from 10 wt. % to 90 wt. % relative to the thermoset polymer; the second backbone segments are present in an amount ranging from 0.01 wt. % to 20 wt. % (e.g., 0.2-8 wt. % or 1-5 wt. % more preferably) relative to the thermoset polymer; and/or the third backbone segments are present in an amount ranging from 10 wt. % to 90 wt. % relative to the thermoset polymer. More generally, the first, second, and third backbone segments can be incorporated into the thermoset omniphobic coating in a variety of relative weight amounts. In an embodiment, the first backbone segments are present in an amount ranging from 10 wt. % to 90 wt. % relative to the thermoset omniphobic coating (e.g., at least 10, 15, or 20 wt. % and/or up to 30, 40, 50, 60, 70, 80, or 90 wt. %; such as 30 wt. % to 70 wt. %). In an embodiment, the second backbone segments are present in an amount ranging from 0.01 wt. % to 20 wt. % relative to the thermoset omniphobic coating (e.g., at least 0.01, 0.1, 0.2, 0.5, 1, 2, 3, or 5 wt. % and/or up to 3, 5, 8, 10, 15 or 20 wt. %; such as 0.2 wt. % to 8 wt. % or 1 wt. % to 5 wt. %). In an embodiment, the third backbone segments are present in an amount ranging from 10 wt. % to 90 wt. % relative to the thermoset omniphobic coating (e.g., at least 10, 20, 30, 40, or 50 wt. % and/or up to 70, 80, or 90 wt. %, such as 30 wt. % to 70 wt. %). The foregoing ranges can apply as well to the relative weight amounts of the first thermosetting component, the functionalized omniphobic polymer, and the second thermosetting component relative to the total weight amount of the three components before crosslinking reactions and/or relative to all monomeric, oligomeric, and polymeric reaction components added thereto. These components can be derived from renewable as well as non-renewable resources.

In a refinement, the thermoset omniphobic composition further comprises one or more additives selected from the group consisting of nanoclay, graphene oxide, graphene, graphite (e.g., ground), silsesquioxane (e.g., POSS), silicon dioxide (silica), aluminum oxide, cellulose nanocrystals, carbon nanotubes, zirconia, titanium dioxide (titania), diatomaceous earth, biocides, pigments, dyes, thermoplastics, and combinations thereof. The additives can be nano-scale (nanofillers) or micro-scale (microfillers). The additives can be included in the coating composition in a range from 0.5 to 40 wt. %, for example at least 0.5, 1, 2, 5, 7, or 10 wt. % and/or up to 5, 10, 15, 20, 30, or 40 wt. %. The additives can improve thermal conductivity of the corresponding coating to promote (or at least not substantially impede) heat transfer between the inner fluid and outer environment to be cooled, for example including graphene oxide, (ground) graphite, etc. The additives can improve the mechanical properties of the corresponding coating, such as wear-resistance, for example including zirconia, silica, titania, etc.

In a refinement, the thermoset omniphobic composition (e.g., in the form of a coating) has a water contact angle in a range from 90° to 120°. In a refinement, the thermoset omniphobic composition (e.g., in the form of a coating) has an oil contact angle in a range from 1° to 65°. In a refinement, the thermoset omniphobic composition (e.g., in the form of a coating) has a water sliding angle in a range from 1° to 30° for a 75 µl droplet. In a refinement, the thermoset omniphobic composition (e.g., in the form of a coating) has an oil sliding angle in a range from 1° to 20° for a 25 µl droplet.

More generally, the omniphobic properties of the thermoset omniphobic composition or corresponding coating (e.g., for the cured composition, such as on a substrate) can be characterized in terms of one or more contact angles and/or sliding angles for water and/or oil droplets (e.g., vegetable oil and/or hexadecane) on the thermoset coating (e.g., as a coating on a substrate). The following ranges are representative of compositions and coatings according to the disclosure which display favorable omniphobic properties. In an embodiment, the composition or coating has a water contact angle in a range from 90° to 120° (e.g., at least 90°, 95°, 100°, or 105° and/or up to 110°, 115°, or 120°; such as for the cured composition as a coating). In some cases, the water contact angle can be up to about 125° for non-smooth or rough surfaces. In an embodiment, the composition or coating has an oil contact angle in a range from 0° or 1° to 65° (e.g., at least 1°, 10°, 20°, or 30° and/or up to 40°, 50°, 60°, or 65°; such as for the cured composition as a coating). In an embodiment, the composition or coating has a water sliding angle in a range from 0° or 1° to 30° for a 75 µl droplet (e.g., at least 1°, 2°, 4°, 6°, or 8° and/or up to 10°, 15°, 20°, or 30°; such as for the cured composition as a coating). In an embodiment, the composition or coating has an oil sliding angle in a range from 0° or 1° to 20° for a 25 µl droplet (e.g., at least 1°, 2°, 4°, 6°, or 8° and/or up to 10°, 12°, 15°, or 20°; such as for the cured composition as a coating). The contact angles for the omniphobic composition or coating can be higher when nanofillers (e.g., clay, silica, etc.) are included in the composition as compared to a corresponding composition without any nanofillers. For example, in the case of compositions or coatings further including one or more nanofillers (e.g., nanoclay, graphene oxide, graphene, silicon dioxide (silica), aluminum oxide, cellulose nanocrystals, carbon nanotubes, titanium dioxide), the contact angles suitably can range from 100° to 150° for water, and from 20° to 120° for oil. Similarly, the sliding angles for water on the surface of nanofiller-containing compositions or coatings can range from 0° or 1° to 20° for a 25 µl droplet.

In a refinement, the composition has a composite structure comprising: (i) a solid matrix comprising the first backbone segments and the third backbone segments; and (ii) liquid nanodomains comprising the second backbone segments; the liquid nanodomains have a size of 80 nm or less (e.g., average size, such as 80 nm or 50 nm or less; size ranging from 1 nm to 40 nm); and the liquid nanodomains are (i) distributed throughout the solid matrix or (ii) substantially only occupy a thin surface layer (e.g., 5, 10, 15, or 20 nm thick; top or exposed layer when applied to a substrate).

In another aspect, the disclosure relates to a heat transfer apparatus comprising: an omniphobically coated fluid channel according to any of the foregoing aspects and refinements; a fluid (e.g., liquid) source in fluid communication with the omniphobically coated fluid channel and adapted to deliver fluid through the flow volume thereof; and a means for controlling the temperature of fluid delivered through the omniphobically coated fluid channel. The fluid source can be a fluid reservoir for holding and circulating cooling/heating fluid through the heat transfer apparatus in a closed loop. The fluid source can be an inlet providing a continuous flow of fluid from any external source. Any suitable pumping means or other source of pressure differential can be used to deliver and circulate fluid through the channel. The means for controlling temperature can include a heating and/or a cooling means. A cooling means can be used to provide cooled (relative to the external environment) fluid to the inlet of the channel, thereby cooling the environment external to the channel and providing a relatively hotter fluid exiting the channel outlet. Similarly, a heating means can be used to provide heated (relative to the external environment) fluid to the inlet of the channel, thereby heating the environment external to the channel and providing a relatively cooler fluid exiting the channel outlet. In a refinement, the means for controlling temperature comprises a cooler. In another refinement, the means for controlling temperature comprises a heater.

In addition to heat transfer apparatus, the omniphobically coated fluid channel according to the disclosure can be incorporated as a fluid flow component of any of a variety of other apparatus. Examples include one or more of pipes, conduits, or channels for fluid (in particular liquid) flow therethrough, such as pumps, steam circulators, etc.

In another aspect, the disclosure relates to a method for delivering a fluid through a channel, the method comprising: providing an omniphobically coated fluid channel or an apparatus according to any of the foregoing aspects and refinements; flowing a fluid (e.g., liquid) through the flow volume of the omniphobically coated fluid channel. In a refinement, the fluid comprises liquid water. Alternatively or additionally, the fluid can further include an antifreeze component (e.g., freezing point depressant) such as ethylene glycol. In other refinements, the fluid can include non-water liquids, such as oils.

In another aspect, the disclosure relates to a method for forming an omniphobically coated fluid channel, the method comprising: (a) providing a channel comprising at least one sidewall defining an interior channel surface and a flow volume, wherein the channel is adapted to permit fluid flow through the flow volume; (b) reacting (i) at least one first thermosetting component comprising a first functional group reactive with a second thermosetting component comprising a second functional group and a functionalized omniphobic polymer comprising a third functional group and having a glass transition temperature ($T_g$) of 70° C. or less, (ii) at least one functionalized omniphobic polymer comprising the third functional group and having a glass transition temperature ($T_g$) of 70° C. or less, and (iii) at least one second thermosetting component comprising the second functional group, to form a partially crosslinked reaction product; (c) delivering components (i), (ii), and (iii), optionally in the form of the partially crosslinked reaction product, to the flow volume of the channel and in contact with the interior channel surface; and (d) curing the partially crosslinked reaction product to form the thermoset omniphobic composition as a coating on the interior channel surface.

Various refinements of the disclosed method for forming an omniphobically coated fluid channel are possible.

In a refinement, the method further comprises adding to the components (i), (ii), and (iii) one or more additives selected from the group consisting of nanoclay, graphene oxide, graphene, graphite, silsesquioxane, silicon dioxide (silica), aluminum oxide, cellulose nanocrystals, carbon nanotubes, zirconia, titanium dioxide (titania), diatomaceous earth, biocides, pigments, dyes, thermoplastics, and combinations thereof. The additives are thus incorporated into the polymeric matrix upon formation of the partially crosslinked reaction product and the eventual thermoset omniphobic composition coating.

In a refinement, part (c) comprises delivering the components (i), (ii), and (iii) in the form of the partially crosslinked reaction product to the flow volume of the channel and in contact with the interior channel surface, for example as a single solution or mixture. In this case, the components (i), (ii), (iii), and optionally any additives/nanofillers can be mixed and pre-reacted, such as in an external reaction vessel, to from the partially crosslinked reaction product, and then delivered to the channel for subsequent final curing.

In a refinement, part (c) comprises: delivering the components (i) and (iii) (e.g., first and second thermosetting components with optional additives/nanofillers) to the flow volume of the channel and in contact with the interior channel surface; reacting the components (i) and (iii) to partially cure the components; delivering the component (ii) (e.g., functionalized omniphobic polymer) to the flow volume of the channel and in contact with the partially cured components (i) and (iii); and reacting the component (ii) with the partially cured components (i) and (iii) to form the partially crosslinked reaction product on the interior channel surface. This two-step/two-layer process can improve adhesion between the thermoset omniphobic composition coating and the channel.

In a refinement, part (c) comprises: at least partially filling the flow volume of the channel with the partially crosslinked reaction product (e.g., pouring the liquid-phase partially crosslinked reaction product into or otherwise flooding the internal channel flow volume); and delivering a gas flow (e.g., under pressure, such as pressurized air) through the flow volume of the channel, thereby (i) expelling at least some partially crosslinked reaction product from the channel and (ii) leaving at least some partially crosslinked reaction product as a coating on the interior channel surface to be subsequently cured. This process cycle can be repeated if desired, for example to increase overall coating thickness and/or cover interior surface regions that might have been left uncoated in previous coating application(s).

In a refinement, part (c) comprises: at least partially filling the flow volume of the channel with the partially crosslinked reaction product (e.g., pouring the liquid-phase partially crosslinked reaction product into or otherwise flooding the internal channel flow volume); and applying a suction (e.g., negative pressure, suction with a syringe, etc.) to the flow volume of the channel, thereby (i) expelling at least some partially crosslinked reaction product from the channel and (ii) leaving at least some partially crosslinked reaction product as a coating on the interior channel surface to be subsequently cured. This process cycle can be repeated if desired, for example to increase overall coating thickness and/or cover interior surface regions that might have been left uncoated in previous coating application(s).

In a refinement, part (c) comprises: at least partially filling the flow volume of the channel with the partially crosslinked reaction product (e.g., pouring the liquid-phase partially crosslinked reaction product into or otherwise flooding the internal channel flow volume); and draining the flow volume of the channel (e.g., via gravity), thereby (i) expelling at least some partially crosslinked reaction product from the channel and (ii) leaving at least some partially crosslinked reaction product as a coating on the interior channel surface to be subsequently cured. This process cycle can be repeated if desired, for example to increase overall coating thickness and/or cover interior surface regions that might have been left uncoated in previous coating application(s).

In a refinement, the method further comprises: prior to delivering the components (i), (ii), and (iii) to the flow volume of the channel, surface-treating the interior channel surface to improve adhesion between the interior channel surface and the thermoset omniphobic composition coating. Metal channel surfaces can be treated with etching chemicals such as hydrogen fluorine to make the surface polar and create surface holes or pores (e.g., a porous surface layer) to facilitate better adhesion between the omniphobic coating and metal channel sidewall. Plastic channel surfaces can be subjected to plasma treatment to increase surface polarity and omniphobic coating adhesion. Phosphatization can also be used to increase the surface polarity before applying the omniphobic coating.

In a refinement, the method comprises reacting the at least one first thermosetting component, the at least one functionalized omniphobic polymer, and the at least one second thermosetting component to form the partially crosslinked reaction product (i) at a temperature from 20° C. to 150° C. (e.g., 20° C., 40° C., or 60° C. to 30° C., 40° C., 60° C., 80° C., 100° C., or 150° C.) and (ii) for a time from 1 min to 300 min (e.g., 1, 2, 5, or 10 min to 20, 40, 60, 120, or 300 min). The reaction can be performed with or without heating the reaction mixture. Room-temperature (e.g., 20° C. to 30° C.) reactions are possible with longer reaction times and/or the addition of a catalyst.

In a refinement, the method comprises mixing while reacting the at least one first thermosetting component, the at least one functionalized omniphobic polymer, and the at least one second thermosetting component to form the partially crosslinked reaction product.

While the disclosed articles, apparatus, methods, and compositions are susceptible of embodiments in various forms, specific embodiments of the disclosure are illustrated (and will hereafter be described) with the understanding that the disclosure is intended to be illustrative, and is not intended to limit the claims to the specific embodiments described and illustrated herein.

BRIEF DESCRIPTION OF THE DRAWINGS

For a more complete understanding of the disclosure, reference should be made to the following detailed description and accompanying drawings wherein.

DETAILED DESCRIPTION

The disclosure relates to an omniphobically coated fluid channel including a channel defining an interior channel surface and a flow volume, and a thermoset omniphobic composition as a coating on the interior channel surface. The thermoset omniphobic composition (such as an omniphobic polyurethane or epoxy composition) includes a thermoset polymer with first, second, and third backbone segments. The first, second, and third backbone segments can correspond to urethane or urea reaction products of polyisocyanate(s), amine-functional omniphobic polymer(s), and polyol(s), respectively, for omniphobic polyurethanes. Similarly, the first, second, and third backbone segments can correspond to urea or beta-hydroxy amine reaction products of polyamine(s), isocyanate-functional omniphobic polymer(s), and polyepoxide(s), respectively, for omniphobic epoxies. The thermoset omniphobic composition coating protects the underlying channel material (such as metal material) from corrosion, and it can further reduce the pressure drop of fluid flowing through the channel. The omniphobically coated fluid channel can be used as a component of a heat transfer apparatus as a conduit for through-flow of a cooling or heating fluid for heat transfer to/from the environment external to the channel.

The disclosed thermoset omniphobic composition includes a polymer which can be used as a channel coating with the ability to bind to channel substrate materials such as metal with relative ease, in particular due to the strong adhesive properties of its thermoset constituents (e.g., such as for polyurethane or epoxy thermoset constituents). The polymer coating has an omniphobic quality, which can provide a low-friction inner channel surface, thereby reducing the pressure drop/energy cost for pumping fluid through the channel. The polymer can be manufactured without fluorine as a component and/or as a one-pot reaction process, thus reducing the overall production cost. Coatings formed from the polymer composition are durable due to the final crosslinked thermoset matrix.

Omniphobic Composition

Figure 3:
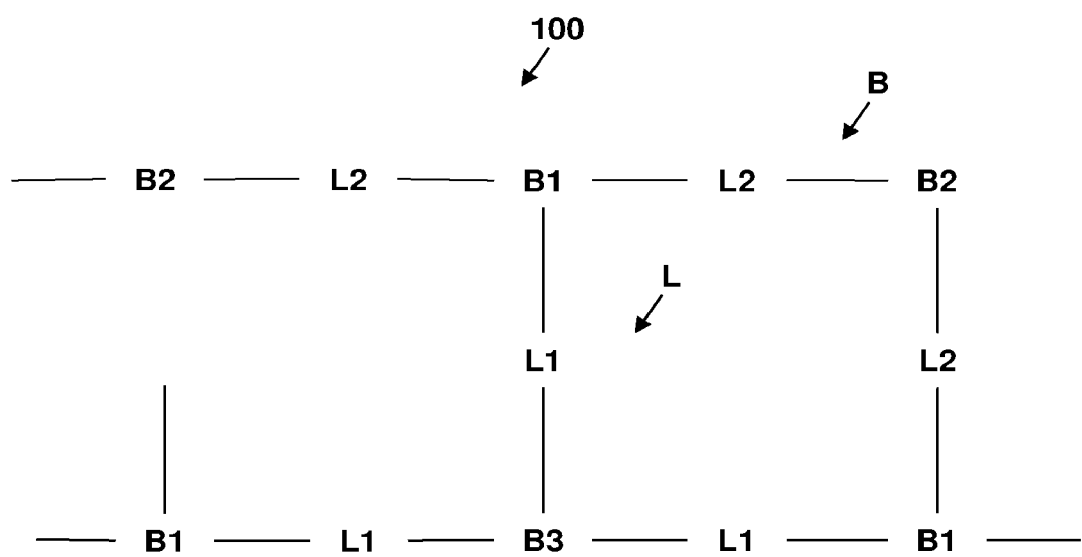
FIG. 3 illustrates a thermoset omniphobic composition according to the disclosure.

FIG. 3 illustrates a thermoset omniphobic composition according to the disclosure. FIG. 3 qualitatively illustrates various backbone segments (B) and linking groups (L) in a crosslinked thermoset polymer 100. The thermoset polymer 100 includes a crosslinked backbone B, which in turn includes (i) first backbone segments B1, (ii) second backbone segments B2, (iii) third backbone segments B3, (iv) first linking groups L1 (e.g., urethane (or carbamate), beta-hydroxy amino) linking first backbone segments and third backbone segments, and (v) second linking groups L2 (e.g., urea) linking first backbone segments and second backbone segments.

As described in more detail below, in embodiments corresponding to a thermoset polyurethane composition, the first backbone segments B1 can result from a polyisocyanate (e.g., monomer, oligomer, or polymer), the second backbone segments B2 can result from a polysiloxane or other omniphobic polymer, and the third backbone segments B3 can result from a polyol (e.g., monomer, oligomer, or polymer). The first linking groups L1 can include urethane (or carbamate) groups and be represented by the general structure —NR$_1$—C(=O)O—, where R1 can be H or a C$_1$-C$_{12}$ linear, branched, or cyclic substituted or unsubstituted hydrocarbon group, such as an aliphatic (e.g., alkyl, alkenyl) group or an aromatic group, or a combination of different R1 groups (such as when multiple different reactive components are used). The second linking groups L2 can include urea groups and can be represented by the general structure —NR$_2$—C(=O)—NR$_3$—, where R$_2$ and R$_3$ independently can be H or a C$_1$-C$_{12}$ linear, branched, or cyclic substituted or unsubstituted hydrocarbon group, such as an aliphatic (e.g., alkyl, alkenyl) group or an aromatic group, or a combination of different R$_2$ and/or R$_3$ groups (such as when multiple different reactive components are used).

As similarly described in more detail below, in embodiments corresponding to a thermoset epoxy composition, the first backbone segments B1 can result from an amine (e.g., mono- or poly-amine; monomer, oligomer, or polymer), the second backbone segments B2 can result from a polysiloxane or other omniphobic polymer, and the third backbone segments B3 can result from a polyisocyanate (e.g., monomer, oligomer, or polymer). The first linking groups L1 can include beta-hydroxy (tertiary) amine groups and be represented by the general structure —CH(OH)—CH$_2$—NR$_1$R$_2$, where R$_1$ and R$_2$ independently can be another beta-hydroxy group or the remainder of the amine thermosetting component. The second linking groups L2 can include urea groups and can be represented by the general structure —NR$_2$—C(=O)—NR$_3$—, where R$_2$ and R$_3$ independently can be H or a C$_1$-C$_{12}$ linear, branched, or cyclic substituted or unsubstituted hydrocarbon group, such as an aliphatic (e.g., alkyl, alkenyl) group or an aromatic group, or a combination of different R$_2$ and/or R$_3$ groups (such as when multiple different reactive components are used).

The first backbone segments B1 generally have a structure corresponding to a (polymerization) reaction product from at least one first thermosetting component after it has reacted with at least one of a second thermosetting component and a functionalized omniphobic polymer having a glass transition temperature (T$_g$) of 70° C. or 50° C. or less (described below). The first backbone segments B1 can result from a single first thermosetting component species or a blend of two or more different first thermosetting component species with the same or different degree of functionality, but each being able to react with the second thermosetting component and the functionalized omniphobic polymer. For example, in embodiments corresponding to a thermoset polyurethane composition, the first backbone segments B1 can have a structure corresponding to at least one of a urethane reaction product and a urea reaction product from at least one polyisocyanate (e.g., diisocyanate, triisocyanate, or higher degree of isocyanate functionality) with a polyol (urethane) or an amine-functional omniphobic polymer (urea). The first backbone segments B1 can result from a single polyisocyanate (e.g., a diisocyanate, a triisocyanate) species or a blend of two or more different polyisocyanate species with the same or different degree of isocyanate functionality. Similarly, in embodiments corresponding to a thermoset epoxy composition, the first backbone segments B1 can have a structure corresponding to at least one of a beta-hydroxy (tertiary) amine product and a urea reaction product from at least one amine (e.g., monoamine, diamine, triamine, or higher degree of isocyanate functionality) with a epoxide (beta-hydroxy amine) or an isocyanate-functional omniphobic polymer (urea). The first backbone segments B1 can result from a single amine (e.g., monoamine, diamine, triamine) species or a blend of two or more different amine species with the same or different degree of amine functionality.

The second backbone segments B2 generally have a structure corresponding to a (polymerization) reaction product from at least one functionalized omniphobic polymer having a glass transition temperature (T$_g$) of 70° C. or 50° C. or less after it has reacted with the first thermosetting component. The functionalized omniphobic polymer includes a functional group reactive with the first thermosetting component (e.g., amino group, isocyanate group, hydroxyl group, carboxylic group). For example, in embodiments corresponding to a thermoset polyurethane composition, the second backbone segments B2 can have a structure corresponding to a urea reaction product from at least one amine-functional omniphobic polymer having a glass transition temperature (T$_g$) of 70° C. or 50° C. or less (e.g., monoamine-functional, diamine-functional, or higher degree of amine functionality) and a polyisocyanate. Similarly, in embodiments corresponding to a thermoset epoxy composition, the second backbone segments B2 can have a structure corresponding to a beta-hydroxy (tertiary) amine reaction product from at least one isocyanate-functional omniphobic polymer having a glass transition temperature ($T_g$) of 70° C. or 50° C. or less (e.g., mono isocyanate-functional, diisocyanate-functional, or higher degree of isocyanate functionality) and an amine (e.g., monoamine, diamine, triamine). In various embodiments, the functionalized omniphobic polymer has a glass transition temperature in a range from −150° C. to 70° C. or 50° C. (e.g., at least −150° C., −120° C., −100° C., or −50° C. and/or up to −10° C., 0° C., 10° C., 20° C., 30° C., 40° C., 50° C., 60° C., or 70° C.). The functionalized omniphobic polymer can be either in a liquid or a rubbery state at common use temperatures of the final coating, for example in a range from 10° C. to 40° C. or 20° C. to 30° C. In various embodiments, the functionalized omniphobic polymer is a liquid at a temperature in a range from 10° C. to 40° C. (e.g., from 20° C. to 30° C., or about room temperature, such as where the functionalized omniphobic polymer has a melting temperature (Tm) below 10° C. or 20° C.). The functional groups (e.g., amino, isocyanate, hydroxyl, carboxylic) can be terminal and/or pendant from the omniphobic polymer. In an embodiment, the functional groups are terminal groups on a omniphobic polymer (e.g., linear omniphobic polymer with one or two terminal functional groups). The second backbone segments B2 can result from a single functionalized omniphobic polymer species or a blend of two or more different functionalized omniphobic polymer species with the same or different degree of functionality. The functionalized omniphobic polymer can generally include one or more of functionalized polysiloxanes, functionalized polyperfluoroethers, functionalized polybutadienes, functionalized poly(ethylene glycol) methyl ether ("PEO"), functionalized polyisobutylene ("PIB"), functionalized branched polyolefins, functionalized low molecular weight polyolefins, functionalized polyacrylates and polymethacrylates (e.g., also including $C_2$-$C_{16}$ pendant alkyl groups), and any other omniphobic polymer with a glass transition temperature of 70° C. or 50° C. or less. In an embodiment, the functionalized omniphobic polymer, the second backbone segments B2, and/or the corresponding omniphobic composition can be free from fluorine or fluorinated components (e.g., not using functionalized polyperfluoroethers or other fluorine-containing components during synthesis).

The third backbone segments B3 generally have a structure corresponding to a (polymerization) reaction product from at least one second thermosetting component after it has reacted with the first thermosetting component. The third backbone segments B3 can result from a single second thermosetting component species or a blend of two or more different second thermosetting component species with the same or different degree of functionality, but each being able to react with the first thermosetting component. For example, in embodiments corresponding to a thermoset polyurethane composition, the third backbone segments B3 can have a structure corresponding to a urethane reaction product from at least one polyol (e.g., diol, triol, or higher degree of hydroxyl functionality) and a polyisocyanate. The third backbone segments B3 can result from a single polyol species or a blend of two or more different polyol species with the same or different degree of hydroxyl functionality. Similarly, in embodiments corresponding to a thermoset epoxy composition, the third backbone segments B3 can have a structure corresponding to a beta-hydroxy (tertiary) amine product from at least one amine (e.g., monoamine, diamine, triamine, or higher degree of isocyanate functionality) with a epoxide (beta-hydroxy amine). The third backbone segments B3 can result from a single epoxide species or a blend of two or more different amine epoxide with the same or different degree of epoxide functionality.

The first linking groups L1 have a structure corresponding to a reaction product of a first functional group of the first thermosetting component and a second functional group of the second thermosetting component. The second linking groups L2 have a structure corresponding to a reaction product of the first functional group of the first thermosetting component and a third functional group of the functionalized omniphobic polymer. The first, second, and third functional groups generally can be selected from isocyanate, hydroxy, amino, epoxide, and carboxylic groups. In certain embodiments, the first functional group, the second functional group, and the third functional group are different from each other, (e.g., isocyanate, hydroxy, and amino, respectively, for thermoset polyurethane with an amino-functional omniphobic polymer; amino, isocyanate, and epoxide, respectively for a thermoset epoxy with an isocyanate-functional omniphobic polymer). For example, in embodiments corresponding to a thermoset polyurethane composition, The first linking groups L1 can have a structure corresponding to a urethane reaction product of a polyisocyanate as the first thermosetting component (i.e., with an isocyanate group as the first functional group) and a polyol as the second thermosetting component (i.e., with a hydroxyl group as the second functional group), and the second linking groups L2 can have a structure corresponding to a urea reaction product of the polyisocyanate as the first thermosetting component and an amine-functional omniphobic polymer as the functionalized omniphobic polymer (i.e., with an amino group as the third functional group). Similarly, in embodiments corresponding to a thermoset epoxy composition, The first linking groups L1 can have a structure corresponding to a beta-hydroxy amine reaction product of an amine as the first thermosetting component (i.e., with an amino group as the first functional group) and a polyepoxide as the second thermosetting component (i.e., with an epoxide group as the second functional group), and the second linking groups L2 can have a structure corresponding to a urea reaction product of the amine as the first thermosetting component and an isocyanate-functional omniphobic polymer as the functionalized omniphobic polymer (i.e., with an isocyanate group as the third functional group).

In some embodiments, the first and third functional groups have a higher reaction rate with each other relative to the first and second functional groups with each other, for example under the same reaction (e.g., drying, heating, and/or curing) conditions. In some embodiments, the second and third functional groups are generally non-reactive. As an illustration and in the context of the representative thermoset polyurethane and thermoset epoxy compositions according the disclosure, the reaction between isocyanate and amino groups is relatively fast, in particular in comparison to a corresponding reaction between isocyanate and hydroxyl groups and a corresponding reaction between amino and epoxide groups. Thus, for a thermoset polyurethane composition, the isocyanate and amino groups (fast reaction) can correspond to the first and third functional groups, respectively, while the isocyanate and hydroxyl groups (slow reaction) can correspond to the first and second functional groups, respectively. Likewise, for a thermoset epoxy composition, the amino and isocyanate groups (fast reaction) can correspond to the first and third functional groups, respectively, while the amino and epoxide groups (slow reaction) can correspond to the first and second functional groups, respectively.

The polyisocyanate is not particularly limited and generally can include any aromatic, alicyclic, and/or aliphatic isocyanates having at least two reactive isocyanate groups (—NCO). The polyisocyanate can be petrochemical or biobased, for example being derived from a petrochemical hydrocarbon feedstock or a biobased biomass feedstock. Suitable polyisocyanates contain on average 2-4 isocyanate groups. In some embodiments, the polyisocyanate includes a diisocyanate. In some embodiments, the polyisocyanate includes triisocyanate. Suitable diisocyanates can have the general structure (O=C=N)—R—(N=C=O), where R can include aromatic, alicyclic, and/or aliphatic groups, for example having at least 2, 4, 6, 8, 10 or 12 and/or up to 8, 12, 16, or 20 carbon atoms. Examples of specific polyisocyanates include 1,5-naphthylene diisocyanate, 4,4'-diphenylmethane diisocyanate (MDI), hydrogenated MDI, xylene diisocyanate (XDI), tetramethylxylol diisocyanate (TMXDI), 4,4'-diphenyl-dimethylmethane diisocyanate, di- and tetraalkyl-diphenylmethane diisocyanate, 4,4'-dibenzyl diisocyanate, 1,3-phenylene diisocyanate, 1,4-phenylene diisocyanate, one or more isomers of tolylene diisocyanate (TDI, such as toluene 2,4-diisocyanate), 1-methyl-2,4-diisocyanatocyclohexane, 1,6-diisocyanato-2,2,4-trimethylhexane, 1,6-diisocyanato-2,4,4-trimethylhexane, 1-iso-cyanatomethyl-3-isocyanato-1,5,5-trimethylcyclohexane, chlorinated and brominated diisocyanates, phosphorus-containing diisocyanates, 4,4'-diisocyanatophenyl-perfluoroethane, tetramethoxybutane 1,4-diisocyanate, butane 1,4-diisocyanate, hexane 1,6-diisocyanate (or hexamethylene diisocyanate; HDI), HDI dimer (HDID), HDI trimer (HDIT), HDI biuret, 1,5-pentamethylene diisocyanate (PDI), PDID (dimer of PDI), PDIT (trimer of PDI), PDI biuret, dicyclohexylmethane diisocyanate, cyclohexane 1,4-diisocyanate, ethylene diisocyanate, phthalic acid bisisocyanatoethyl ester, 1-chloromethylphenyl 2,4-diisocyanate, 1-bromomethylphenyl 2,6-diisocyanate, 3,3-bischloromethyl ether 4,4'-diphenyldiisocyanate, trimethylhexamethylene diisocyanate, 1,4-diisocyanato-butane, 1,2-diisocyanatododecane, and combinations thereof.

The functionalized omniphobic polymer is not particularly limited and generally can include any omniphobic polymer with glass transition temperature of 70° C. or 50° C. or less, such as in a range from −150° C. to 70° C. or 50° C. The functional group of the functionalized omniphobic polymer can include one or more epoxide groups, amino groups, hydroxyl groups, and carboxylic groups (e.g., including only one type of functional group). Examples of general classes of functionalized omniphobic polymers include functionalized polysiloxanes, functionalized polyperfluoroethers, functionalized polybutadienes, functionalized polyolefins (e.g., polyethylene, polypropylene, polybutylene), and combinations or mixtures thereof. The functionalized polyperfluoroether (e.g., functionalized polyperfluoropolyethers) can include mono-, di-, or higher functionalized polyperfluoroethers, or a blend of thereof, such as a blend of mono- and di-functional polyperfluoroethers. The functionalized polybutadiene can include mono-, di-, or higher functional polybutadienes, or a blend of thereof, such as a blend mono- and di-functional polybutadienes. Many suitable functionalized omniphobic polymers are commercially available (e.g., amine-, isocyanate-, or other functional polydimethylsiloxane (PDMS) with a variety of available degrees of functionality and molecular weights). Omniphobic polymers that are not commercially available in their functionalized form can be functionalized using conventional chemical synthesis techniques, for example including but not limited to hydroamination, thiol-ene Michael reaction of amine-carrying thiols, Mitsunobu reaction, and reductive amination.

The functionalized polysiloxane is not particularly limited and generally can include any polysiloxane having mono-, di-, or higher degrees functionality. In some embodiments, the functionalized polysiloxane includes a mono-functional polysiloxane. In some embodiments, the functionalized polysiloxane includes a di-functional polysiloxane. The polysiloxane can be a polydialklylsiloxane having —Si($R_1R_2$)—O— repeat units, where $R_1$ and $R_2$ independently can be $C_1$-$C_{12}$ linear or branched alkyl groups, $C_4$-$C_{12}$ cycloalkyl groups, unsubstituted aromatic groups, or substituted aromatic groups, in particular where $R_1$ and $R_2$ are methyl groups for a polydimethylsiloxane (PDMS). The functional groups are suitably terminal groups. For example, in an amine-functional polydialklylsiloxane, the structure and terminal groups can be represented by $NH_2$—$R_3$—[Si($R_1R_2$)—O]$_x$—$R_3$—$NH_2$ for a diamine or $NH_2$—$R_3$—[Si($R_1R_2$)—O]$_x$—$R_3$ for a monoamine, where $R_3$ independently can be H (when a terminal group) or $C_1$-$C_{12}$ linear or branched alkyl (when a terminal group or a linker for a terminal amine). The functional groups additionally can be pendant groups, for example in a amine-functional polydialklylsiloxane represented by $R_3$—[Si($R_1R_2$)—O]$_x$—[Si($R_{1'}R_{2'}$)—O]$_y$—$R_3$, where $R_{1'}$ and $R_{2'}$ independently can be the same as $R_1$ and $R_2$, but at least one or both of $R_{1'}$ and $R_{2'}$ independently is a $C_1$-$C_{12}$ linear or branched alkyl linker group with a terminal amine group (e.g., —$NH_2$). Illustrative isocyanate-functional polydialklylsiloxanes can be represented by the foregoing structures with isocyanate groups (—NCO) replacing the amino groups (—$NH_2$). Some examples of functionalized polyslioxanes include functionalized polydimethylsiloxane, functionalized polymethylphenylsiloxane, and functionalized polydiphenylsiloxane.

Some examples of polyperfluoropolyethers with functional group(s) include functionalized poly(n-hexafluoropropylene oxide) (e.g., —($CF_2CF_2CF_2O$)n-)$NH_2$ or —($CF_2CF_2CF_2O$)n-)NCO for amino or isocyanate groups) and functionalized poly(hexafluoroisopropylene oxide) (e.g., —(CF($CF_3$)$CF_2O$)n$NH_2$ or PFPO—$NH_2$; —(CF($CF_3$)$CF_2O$)nNCO or PFPO—NCO). Some examples of functionalized atactic polyolefins include functionalized poly(1-butene), branched polyethylene, poly(cis-isoprene), poly(trans-isoprene), and poly (1-octene). Some examples of functionalized polyacrylates include poly(3-functionalized propyl acrylate). Similarly, mono-functional polymers include mono-functional polyisobutylene (e.g., PIB—$NH_2$; PIB—NCO), mono-functional polypolyethylene glycol (e.g., PEG-$NH_2$, PEG-NCO), mono-functional poly(1-butene) (e.g., PB—$NH_2$, PB—NCO, cis and trans) can also be used as the low-glass transition temperature ($T_g$ less than 70° C. or 50° C.) polymers, either alone or in combination with other functionalized omniphobic polymers.

The functionalized omniphobic polymers can have any suitable molecular weight in view of desired glass transition temperature, for example having a molecular weight ranging from 300 to 50,000 g/mol. In various embodiments, the molecular weight can be at least 300, 800, 1000, 1500, or 2000 and/or up to 1000, 2000, 3000, 5000, or 50,000 g/mol. The molecular weight can be expressed as a number-average or weight-average value in the units of gram/mole (g/mol). Alternatively or additionally, the functionalized omniphobic polymer can have a number of repeat units ranging from 4 to 600 (e.g., at least 4, 10, 12, 15, 20, or 25 and/or up to 12, 15, 20, 30, 40, 60, 200, or 600; such as a (number) average number of repeat units). Some embodiments can include a blend of two or more amine-functionalized omniphobic polymers with different average molecular weights, such as one with 300-1500 g/mol and another with 1500-50,000 g/mol with a higher average molecular weight than the first. Blends of functionalized omniphobic polymers (e.g., differing in molecular weight and/or in degree of functionality) can improve the combination of water- and oil-repellency properties of the final composition. For example, a monofunctional polysiloxane can provide better water and oil repellency than a di-functional polysiloxane. Low MW functionalized polysiloxanes (e.g., PDMS, such as having a MW range of about 800-1200 g/mol or an average MW of about 1000 g/mol) can provide an improved water repellency, while Higher MW functionalized polysiloxanes (e.g., PDMS, such as about 2000 g/mol or above for an average or range of MW) can provide an improved oil repellency.

The polyol is not particularly limited and generally can include any aromatic, alicyclic, and/or aliphatic polyols with at least two reactive hydroxyl/alcohol groups (—OH). The polyol can be petrochemical or biobased, for example being derived from a petrochemical hydrocarbon feedstock or a biobased biomass feedstock. Suitable polyol monomers contain on average 2-4 hydroxyl groups on aromatic, alicyclic, and/or aliphatic groups, for example having at least 4, 6, 8, 10 or 12 and/or up to 8, 12, 16, or 20 carbon atoms. In some embodiments, the polyol is a diol. In some embodiments, the polyol is a triol. Examples of specific polyols include one or more of polyether polyols (e.g., polypropylene oxide-based triols such as commercially available MULTRANOL 4011 with a MW of about 300), triethanolamine, hydroxlated (meth)acrylate oligomers (e.g., 2-hydroxylethyl methacrylate or 2-hydroxyethyl acrylate), glycerol, ethylene glycol, diethylene glycol, triethylene glycol, tetraethylene glycol, propylene glycol, dipropylene glycol, tripropylene glycol, 1,3-propanediol, 1,3-butanediol, 1,4-butanediol, neopentyl glycol, 1,6-hexanediol, 1,4-cyclohexanedimethanol, glycerol, trimethylolpropane, 1,2,6-hexanetriol, pentaerythritol, (meth)acrylic polyols (e.g., having random, block, and/or alternating hydroxyl functionalities along with other (meth)acrylic moieties), and isosorbide. The polyol can be biobased or made of synthetic feedstock.

The polyepoxide is not particularly limited and generally can include polyepoxide-substituted aromatic hydrocarbons, aliphatic hydrocarbons, cycloaliphatic hydrocarbons, ethers thereof, esters thereof, imines thereof, and combinations thereof. The polyepoxide can include hydrocarbons with two or more epoxide groups and one or more aromatic, aliphatic, cycloaliphatic, ether, ester, and/or imine groups in the hydrocarbon to which the epoxide groups are attached. Suitable polyepoxides can be derived from petroleum and plant materials. Suitable polyepoxides include two or more glycidyl ether groups (i.e., epoxide-containing groups). Some examples of polyepoxides include, but are not limited to, bisphenol A epoxy (e.g., diglycidyl ether of bisphenol A having 1 or 2-25 bisphenol A repeat units), bisphenol F epoxy (e.g., diglycidyl ether of bisphenol F having 1 or 2-25 bisphenol F repeat units), epoxy phenol novolac, epoxy cresol novolac, cycloaliphatic epoxies, halogenated epoxies, epoxy-vinyl esters, tetraglycidylmethylenedianiline (TGMDA), 3,4-epoxycyclohexylmethyl 3,4-epoxycyclohexanecarboxylate (ECC), bis[3,4-epoxycyclohexylm ethyl] adipate (BECHMA), poly(glycidyl methacrylate), epoxies of rosin acid, epoxies of diphenolic acid, epoxies of tannin acid, epoxies derived from glucose, isosorbide epoxies, eugenol epoxies, furan epoxies, cathechin epoxies, vanillin-based epoxies, quercetin epoxies, epoxies derived from gallic acid, epoxies from phenols, epoxies from cardanols, epoxies from plant oils, terpene oxides (e.g., limonene dioxide), and combinations thereof.

The amine is not particularly limited and generally can include polyamine-substituted aromatic hydrocarbons, aliphatic hydrocarbons, cycloaliphatic hydrocarbons, ethers thereof, esters thereof, imines thereof, and combinations thereof. The amine can include hydrocarbons with two or more amino groups and one or more aromatic, aliphatic, cycloaliphatic, ether, ester, and/or imine groups in the hydrocarbon to which the amino groups are attached. Suitable amines can be derived either petrochemicals or plant materials. Some examples include, but are not limited to, isophorone diamine, diaminopropyl isosorbide, furfuryldiamine, polylysine, menthane diamine, tris(dimethylaminomethyl)phenol, melamine, bis(3-aminopropyl)amine, N,N'-bis(3-aminopropyl)-1,3-propanediamine, 3,3'-diamino-N-methyldipropylamine, tris(3-aminopropyl)amine, 1,2-bis(3-aminopropylamino)ethane, diethylenetriamine, polyetheramines (e.g., JEFFAMINE polyetheramines available from Huntsman Chemical). The amines can be primary, secondary or a combination of both.

In some embodiments including a thermoset polyurethane polymer, at least one of the polyisocyanate and the polyol is a tri- or higher functional isocyanate or alcohol/hydroxy compound, respectively, to promote crosslinking of the backbone segments in the final thermoset polyurethane polymer. Alternatively or additionally, in some embodiments, the functionalized omniphobic polymer is a tri- or higher amine-functional compound (e.g., tri-functional amine PDMS) so that the omniphobic polymer can serve as a crosslinker, either alone or in combination with polyisocyanate and/or polyol crosslinkers.

In some embodiments including a thermoset epoxy polymer, at least one polyepoxide has a functionality greater than two or at least one amine has a functionality greater than one promote crosslinking of the backbone segments in the final epoxy polyurethane polymer. Specifically, since a single primary amino group can react with two epoxide groups, either some species with three or more epoxide groups or two or more amino groups (which can form four or more bonds with epoxides) are used for crosslinking. Typically a diepoxide and a diamine are used. Alternatively or additionally, in some embodiments, the functionalized omniphobic polymer is a tri- or higher isocyanate-functional compound (e.g., tri-functional isocyanate PDMS) so that the omniphobic polymer can serve as a crosslinker, either alone or in combination with polyepoxide and/or amine crosslinkers.

The first, second, and third backbone segments can be incorporated into the thermoset polymer in a variety of relative weight amounts. In an embodiment, the first backbone segments are present in an amount ranging from 10 wt. % to 90 wt. % relative to the thermoset polymer (e.g., at least 10, 15, or 20 wt. % and/or up to 30, 40, 50, 60, 70, 80, or 90 wt. %; such as 30 wt. % to 70 wt. %), which amounts can equivalently correspond to the first thermosetting component(s), for example as added to a reaction mixture and relative to all monomeric, oligomeric, and polymeric reaction components added thereto. In an embodiment, the second backbone segments are present in an amount ranging from 0.01 wt. % to 20 wt. % relative to the thermoset polymer (e.g., at least 0.01, 0.1, 0.2, 0.5, 1, 2, 3, or 5 wt. % and/or up to 3, 5, 8, 10, 15 or 20 wt. %; such as 0.2 wt. % to 8 wt. % or 1 wt. % to 5 wt. %), which amounts can equivalently correspond to the functionalized omniphobic polymer(s), for example as added to a reaction mixture and relative to all monomeric, oligomeric, and polymeric reaction components added thereto. In an embodiment, the third backbone segments are present in an amount ranging from 10 wt. % to 90 wt. % relative to the thermoset polymer (e.g., at least 10, 20, 30, 40, or 50 wt. % and/or up to 70, 80, or 90 wt. %, such as 30 wt. % to 70 wt. %), which amounts can equivalently correspond to the second thermosetting component(s), for example as added to a reaction mixture and relative to all monomeric, oligomeric, and polymeric reaction components added thereto.

Similarly, the first, second, and third backbone segments can be incorporated into the thermoset polymer in a variety of relative molar amounts based on the corresponding reactive functional groups of their corresponding monomeric, oligomeric, and polymeric reaction components. Suitably, approximately a 1:1 molar ratio of combined second and third functional groups (e.g., hydroxy and amino groups, respectively; isocyanate and epoxide groups, respectively) relative to first functional groups (e.g., isocyanate groups; amino groups) is used when combining reactive components to make the omniphobic composition. In most cases, first functional groups are added in a slight molar excess. Final molar ratios of (i) first functional groups to (ii) second and third functional groups combined are typically between 1:1 to 1.6:1, for example at least 1:1, 1.1:1, or 1.2:1 and/or up to 1.4:1, 1.5:1, or 1.6:1.

In an embodiment, the thermoset polymer crosslinked backbone can include further types of backbone segments. For example, the backbone can include fourth backbone segments which have a structure corresponding to a reaction product of a mono-functional monomer component having only one first functional group with the second thermosetting component or the functionalized omniphobic polymer. The mono-functional monomer component can be, for example, a monoisocyanate or a monoepoxide, which can be used as a means to control crosslinking degree as well as to incorporate hydrophobic or other functional groups at an external or boundary portion of the thermoset polymer. Examples of monoisocyanates include R—(N=C=O), where R can include aromatic, alicyclic, and/or aliphatic groups, for example having at least 2, 4, 6, 8, 10 or 12 and/or up to 8, 12, 16, or 20 carbon atoms. The fourth backbone segments can be present in an amount ranging from 0.01 wt. % to 4 wt. % relative to the thermoset polymer (e.g., at least 0.01, 0.1, 0.2, or 0.5 wt. % and/or up to 1, 2, or 4 wt. %), which amounts can equivalently correspond to the mono-functional monomer component, for example as added to a reaction mixture and relative to all monomeric, oligomeric, and polymeric reaction components added thereto.

In an embodiment, the thermoset omniphobic composition can include any suitable organic or inorganic filler or additive, which can be included to improve one or more of mechanical properties, optical properties, electrical properties, and omniphobic properties of the final composition. Examples of suitable fillers or additives include nanoclay, graphene oxide, graphene, silicon dioxide (silica), aluminum oxide, diatomaceous earth, cellulose nanocrystals, carbon nanotubes, titanium dioxide (titania), and combinations or mixtures thereof. In addition, the fillers can include biocides, pigments, dyes, a thermoplastic material, or a combination thereof. The fillers can be added in the range from 0.01 wt. % to 10 wt. %, for example in range from 1 wt. % to 5 wt. %

The omniphobic properties of the thermoset composition (e.g., for the cured composition) can be characterized in terms of one or more contact angles and/or sliding angles for water and/or oil droplets (e.g., vegetable oil and/or hexadecane) on the thermoset composition (e.g., as a coating on a substrate). The following ranges are representative of compositions according to the disclosure which display favorable omniphobic properties. In an embodiment, the composition has a water contact angle in a range from 90° to 120° (e.g., at least 90°, 95°, 100°, or 105° and/or up to 110°, 115°, or 120°; such as for the cured composition as a coating). In some cases, the water contact angle can be up to about 125° for non-smooth or rough surfaces. In an embodiment, the composition has an oil contact angle in a range from 0° or 1° to 65° (e.g., at least 1°, 10°, 20°, or 30° and/or up to 40°, 50°, 60°, or 65°; such as for the cured composition as a coating). In an embodiment, the composition has a water sliding angle in a range from 0° or 1° to 30° for a 75 µl droplet (e.g., at least 1°, 2°, 4°, 6°, or 8° and/or up to 10°, 15°, 20°, or 30°; such as for the cured composition as a coating). In an embodiment, the composition has an oil sliding angle in a range from 0° or 1° to 20° for a 25 µl droplet (e.g., at least 1°, 2°, 4°, 6°, or 8° and/or up to 10°, 12°, 15°, or 20°; such as for the cured composition as a coating). The contact angles for the omniphobic coatings can be higher when nanofillers (e.g., clay, silica, etc.) are included in the composition as compared to corresponding compositions without any nanofillers.

Figure 4:
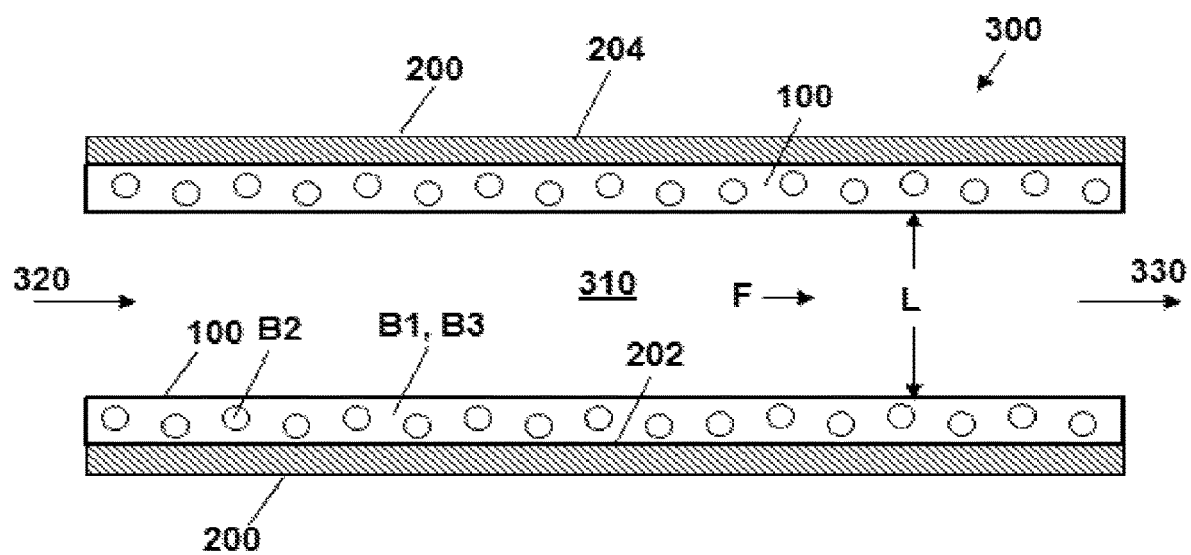
FIG. 4 illustrates a side cross-sectional view of a coated channel according to the disclosure in which the thermoset omniphobic composition channel coating has a composite structure.

The thermoset omniphobic composition generally has a homogeneous structure, for example a homogenous thermoset solid with the first, second, and third backbone segments being generally evenly distributed throughout the composition. This is in contrast to a common "self-stratified" structure with a siloxane (or other hydrophobic or omniphobic polymer group) rich surface and bulk thermoset region with little or no siloxane (or other hydrophobic or omniphobic polymer group). In an embodiment, the thermoset omniphobic composition 100 has a composite structure as illustrated in FIG. 4. The composite structure can include a solid matrix formed primarily from the first backbone segments B1 and the third backbone segments B3 linked together (e.g., with or without some second backbone segments B2 incorporated therein). The composite structure can further include nanodomains distributed throughout the solid matrix. The nanodomains are formed primarily from the second backbone segments B2 (e.g., with or without minor amounts of first and/or third backbone segments B1, B3 incorporated therein), and generally have a size of 80 nm or less, more preferably 50 nm or 40 nm or less. The nanodomains can be liquid nanodomains or rubbery nanodomains, depending on the usage temperature of the omniphobic composition relative to the glass transition and melting temperatures of the functionalized omniphobic polymer precursor to the second backbone segments. For example, the nanodomains can have a size or diameter of at least 0.1, 1, 10, 15 or 20 nm and/or up to 30, 40, 50, or 80 nm; for example 1 nm to 40 nm or 1 nm to 80 nm. The ranges can represent a distribution of sizes for the nanodomains and/or a range for an average nanodomain size (e.g., weight-, number-, or volume-average size). In a lower limit as the size of the nanodomains approaches zero, the composition approaches a homogeneous structure as a homogeneous thermoset solid with the first, second, and third backbone segments B1, B2, B3 being generally evenly distributed throughout the omniphobic composition 100 as illustrated in FIG. 5.

Coated Channel and Related Apparatus

Figure 5:
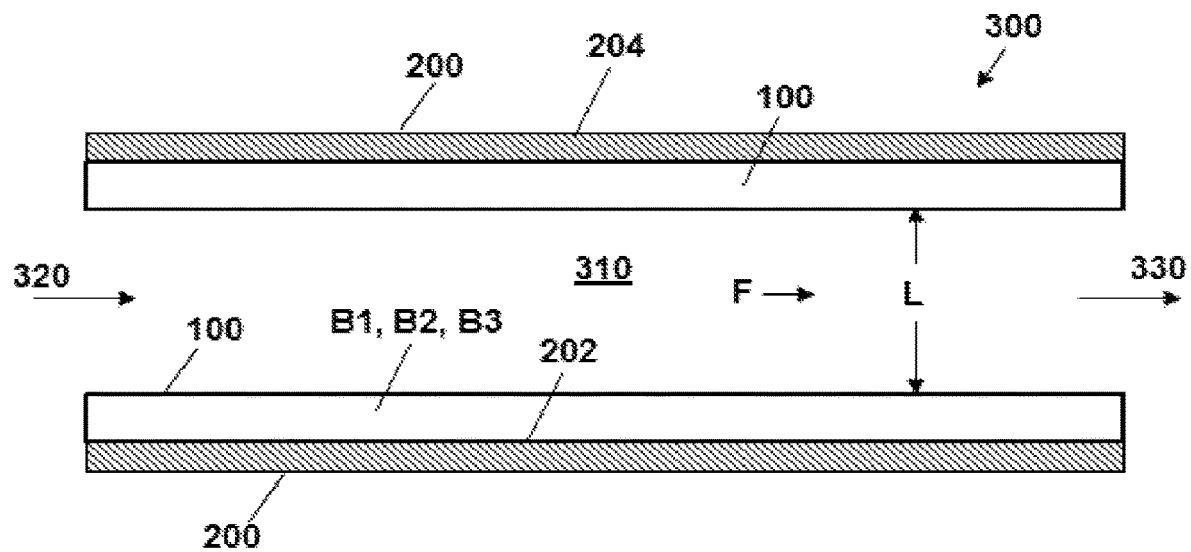
FIG. 5 illustrates a side cross-sectional view of a coated channel according to the disclosure in which the thermoset omniphobic composition channel coating has a homogeneous structure.

FIGS. 4 and 5 illustrate omniphobically coated fluid channels 300 according to the disclosure. The coated channel 300 includes a channel sidewall 200 that can have any suitable geometry. For example, the channel sidewall 200 can be in the form of a tube, conduit, etc., and it can include a single sidewall (e.g., for a circular or other round tube), four sidewalls for a square or other rectangular channel, etc. The channel sidewall 200 has an interior surface 202 and an exterior surface 204. The interior surface 202 generally faces an internal flow volume 310 of the coated channel 300. The exterior surface 204 opposes the interior surface, and the exterior surface 204 can include further layers or coatings (not shown), or it could be exposed to the external (ambient) environment E, for example to promote heat transfer between the external environment E and fluid flowing through the coated channel 300. A thermoset omniphobic composition 100 according to any of the variously disclosed embodiments is present as a coating on the interior surface 202. The thermoset omniphobic composition 100 can be adhered or otherwise bound to the interior surface 202. For example, thermoset omniphobic composition 100 can be in direct contact with the inner surface 202, or there can be one or more intermediate layers (not shown) between the composition 100 and the surface 202, for example to improve adhesion therebetween.

The coated channel 300 defines the internal flow volume 310, which is generally in the space surrounded or otherwise defined by the interior surface 202 with the thermoset omniphobic composition 100 thereon. The coated channel 300 permits fluid flow through the volume 310, for example between an inlet 320 and an outlet 330 in a flow direction F as illustrated. The specific fluid flowing through the channel is not particularly limited, for example including water, an aqueous mixture including water and other dissolved/dispersed components, or other fluid material. As described in more detail below, the fluid can be a heated or cooled heat transfer fluid (e.g., relative to an external environment E temperature) to either heat or cool the external environment E, respectively, as the fluid flows through the coated channel 300.

The channel wall 200 is not particularly limited, and the channel generally can be formed from or otherwise include any selected material having desired structural properties, chemical properties, heat transfer properties, etc. For example, the channel can be formed from or otherwise contain one or more materials subject to corrosion or other degradation with prolonged contact to a liquid, such as water, whether a metal or non-metal. In an embodiment, the channel or channel wall 200 is formed from or otherwise includes one or more metals, in particular the sidewall structure at the inner surface 202 and in proximity with fluid flowing through the channel. Suitable metals can include aluminum, copper (e.g., bronze alloy with tin, brass alloy with zinc), steel (e.g., stainless steel), cast iron (e.g., including 96-98 wt. % iron, 2-4 wt. % carbon, silicon), and/or alloys or other combinations thereof. Such metals can provide a combination of favorable mechanical strength, heat transfer properties, and/or cost. In other embodiments, the channel or channel wall 200 is formed from or otherwise includes one or more non-metals, likewise in particular the sidewall structure at the inner surface 202 and in proximity with fluid flowing through the channel. Suitable non-metals include plastic or polymer materials (e.g., polyvinyl chloride), ceramic materials, glass materials, etc. Regardless of the type of channel material (e.g., metal or non-metal) and its potential susceptibility to corrosion (e.g., in the case of metals/alloys), the omniphobic coatings 100 can be further useful to reduce the pressure drop/energy cost for pumping fluid through the coated channel 300 by providing a low-friction inner surface, which can be particularly useful for viscous fluids, for example including oils such as crude oil.

The thermoset omniphobic composition 100 can have any desired thickness on the channel wall 200. In common applications, the composition 100 has a thickness ranging from 0.01 µm to 100 µm or 500 µm, in particular from 10 µm to 50 µm. More generally, the coating 100 can have a thickness of at least 0.01, 10, 20, 50, or 100 µm and/or up to 200, 500 µm. Typical cast coatings can have thicknesses of 10 µm to 50 µm or 100 µm. Typical spin coatings can have thicknesses of 0.05 µm or 0.10 µm to 0.20 µm or 0.50 µm. Multiple coating layers can be applied to channel wall 200 to form even thicker layers of the composition 100 (e.g., above 500 µm or otherwise) if desired.

As illustrated, the coated channel 300 has a characteristic length dimension L that is perpendicular to the flow direction F through the flow volume 310. The dimension L can represent a diameter of a circular-cross section channel (e.g., pipe or tube). The dimension L can similarly represent a height, width, or maximum lateral dimension of a square- or rectangular-cross section channel (e.g., duct). The dimension L is not particularly limited, but it suitably can be in a range from 0.2 cm to 200 cm. For example, the characteristic length L can be at least 0.2, 0.3, 0.5, 1, 2, 5, 7, 10, or 20 cm and/or up to 5, 10, 20, 25, 30, 40, 50, 70, 100, 150, or 200 cm.

Figure 6:
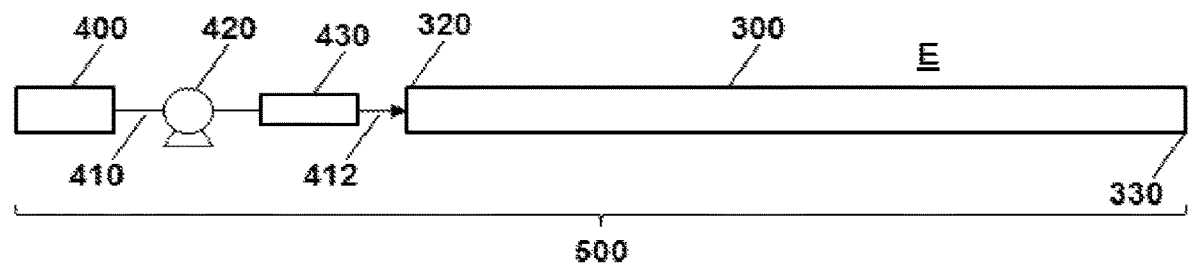
FIG. 6 illustrates a heat transfer apparatus according to the disclosure.

The coated channel 300 can be incorporated as a fluid flow component of any of a variety of apparatus, for example as a means to promote heat transfer and/or reduce pressure drop in a fluid flow system. Examples include heat transfer apparatus (e.g., heat exchangers), pipes, conduits, or channels for fluid (in particular liquid) flow therethrough, pumps, steam circulators, etc. FIG. 6 illustrates a heat transfer apparatus 500 which includes a coated channel 300 according to the various embodiments of the disclosure. The apparatus 500 includes a fluid (e.g., liquid) source or reservoir 400 in fluid communication with the coated channel 300. The fluid source 400 can be a fluid reservoir for holding and circulating cooling/heating fluid through the heat transfer apparatus 500 in a closed loop. The fluid source 400 similarly can be an inlet providing a continuous flow of fluid from any external source. Fluid is delivered from an outlet 410 of the reservoir 400, for example via a pump 420. Any suitable pumping means 420 or other source of pressure differential can be used to deliver and circulate fluid through the channel 300. The apparatus 500 further includes a means 430 for controlling the temperature of fluid delivered through the coated channel 430. Fluid exiting the fluid source 400 via the outlet 410 is heated or cooled as desired to provide a temperature-adjusted fluid stream 412 entering the coated channel 300 via the inlet 320. The temperature control means 420 can include any suitable heating and/or cooling means. For example, the heating means can include an electric heater, a steam heater, or other type of heater. Similarly, the cooling means can include any cooling device such as a cooler, refrigerator, heat pump, etc. A cooling means can be used to provide cooled (relative to the external environment) fluid 412 to the channel inlet 320. The cooled fluid can thereby cool a relatively warmer environment E external to the channel 300 via heat transfer through the channel wall 200 and composition 100, thus providing a relatively hotter fluid exiting the channel outlet 330. Similarly, a heating means can be used to provide heated (relative to the external environment) fluid 412 to the channel inlet 320. The heated fluid can thereby heat a relatively cooler environment E external to the channel 300 via heat transfer through the channel wall 200 and composition 100, thus providing a relatively cooler fluid exiting the channel outlet 330.

The fluid in the fluid source 400 is not particularly limited and can include any fluid or liquid that is desirably transported through the channel 300 and/or that has favorable heat transfer properties. For example, the fluid can include liquid water, for example including an antifreeze component (e.g., freezing point depressant) therein such as ethylene glycol. In other embodiments, the fluid can include non-water liquids, such as oils.

Method of Making Composition and Coated Channel

The thermoset omniphobic composition according to the disclosure generally can be formed by first reacting the first thermosetting component(s), the functionalized omniphobic polymer(s), and the second thermosetting component(s) to form a partially crosslinked (e.g., not fully crosslinked) reaction product, and then curing the partially crosslinked reaction product to form the thermoset omniphobic composition (e.g., after application a substrate to provide an omniphobic coating thereon). The partially crosslinked reaction product contains at least some unreacted first, second, and/or third functional groups for eventual further reaction during curing/full crosslinking. In some embodiments, the partially crosslinked reaction product contains at least some unreacted first and second functional groups, but is free or substantially free of unreacted third functional groups (e.g., where all or substantially all of the third functional groups in the functionalized omniphobic polymer have reacted with a first functional groups, but the first thermosetting component still has at least some free some unreacted first functional groups remaining). The initial, partial crosslinking reaction can be performed in a suitable reaction solvent or medium, for example an aprotic organic solvent such as acetone, tetrahydrofuran, 2-butanone, esters (e.g., methyl, ethyl, n-propyl, butyl esters of acetic acid such as n-butyl acetate, etc.), dimethylformamide, dimethyl carbonate, etc. In some embodiments, a reaction catalyst such as salts of tin (e.g., tin(II) 2-ethylhexanoate) or iron, and tertiary amines (e.g., triethylamine) can be used. can be added to catalyze the reaction between the polyisocyanate and the polyol. Curing can be performed by heating (e.g., in an oven, with exposure to a heat lamp, etc.) at a temperature from 80° C. or 100° C. to 140° C. or 180° C. and/or for a time from 1 hr to 24 hr. Lower heating temperature or ambient temperature curing also possible, such as room temperature curing (e.g., 20° C. to 30° C.) for 5-10 days, lower heating (e.g., 30° C. or 40° C. to 60° C. for 2-4 days or 60° C. to 80° C. for 1-3 days).

Reaction to form the partially crosslinked reaction product generally can be performed at any suitable reaction temperature(s) and time(s), which can be selected such that there is sufficient time to partially (but not completely) crosslink/cure the components of the reaction mixture, thus leaving some reactive functional groups for eventual full curing/crosslinking in the final thermoset composition. In an embodiment, reaction to form the partially crosslinked reaction product is performed (i) at temperature from 20° C. or 40° C. to 80° C. or 100° C. and (ii) for a time from 5 min to 300 min. Thus, reaction can be performed with or without heating the reaction mixture. Room-temperature (e.g., 20° C. to 30° C.) reactions are possible with longer reaction times and/or the addition of a catalyst. The initial reaction between the first thermosetting component and the functionalized omniphobic polymer is generally very fast and need not be heated for suitable reaction times. Subsequent reaction between the first thermosetting component and the second thermosetting component is slower and preferably involves heating and/or the use of a catalyst.

In an embodiment, reaction to form the partially crosslinked reaction product includes stirring or otherwise mixing the reaction components to improve reactant homogeneity and that of the eventual product. Mixing or stirring during the reaction between the first thermosetting component and the functionalized omniphobic polymer (e.g., whether the two are reacted/combined separately from or together with the second thermosetting component) is particularly desirable because the first/third functional group reaction is generally very fast, and mixing of the reaction mixture is desirable to help form a distributed partially cured reaction product in which most first thermosetting component molecules have at least one free first functional group for eventual reaction with a second thermosetting component molecule. Put another way, stirring/mixing helps to avoid a situation in which some first thermosetting component molecules have all of their first functional groups reacted with third functional groups from the functionalized omniphobic polymer, which in turn prevents further reaction with a second thermosetting component molecule for incorporation into the crosslinked network of the thermoset polymer and can lead to opaque or hazy films (i.e., instead of desirably transparent films). Accordingly, mixing/stirring combined with appropriate selection of stoichiometric ratios between the first thermosetting component, the functionalized omniphobic polymer, and the second thermosetting component helps to ensure that most, if not all or substantially all, first thermosetting component molecules react with at least one second thermosetting component molecule (e.g., having at least one first linking group L1).

In an embodiment, reaction to form the partially crosslinked reaction product includes first reacting the first thermosetting component and the functionalized omniphobic polymer (e.g., in the absence of the second thermosetting component) to form an initial reaction product. Reaction to form the initial reaction product is preferably performed with mixing or stirring as above to obtain a good distribution of unreacted first thermosetting component molecules and/or partially third functional group-reacted first thermosetting component molecules with at least one first functional group available for further reaction. The initial reaction product suitably contains third functional group-reacted first thermosetting component molecules as well as possibly one or both of unreacted first thermosetting component molecules and unreacted functionalized omniphobic polymers. This step can be performed in a single reaction vessel prior to addition of the at least one second thermosetting component, and is preferably performed in the absence of any reactive second functional group-containing species, whether the second thermosetting component or otherwise. The initial reaction product is then reacted with the second thermosetting component to form partially crosslinked reaction product, for example by adding or otherwise combining the polyol with the initial reaction product between the first thermosetting component and functionalized omniphobic polymer (e.g., in the same reaction vessel, and optionally with heating and/or further catalyst addition). This sequence of addition/reaction is preferable but required. Other sequences of addition or combination of all three reactive components at the same time are possible. In some cases, the resulting thermoset omniphobic composition might have relatively poorer optical properties in terms of being partially opaque or not completely transparent, but the composition generally has the same or comparable omniphobic properties with respect to contact and gliding angles, etc.

In an embodiment, curing the partially crosslinked reaction product includes adding a casting solvent to the partially crosslinked reaction product. Suitably, the casting solvent is one that does not dissolve the functionalized omniphobic polymer, which is a suitable selection whether the final thermoset composition is desired to have an inhomogeneous composite-type structure with nanodomains as described above or a homogeneous structure Examples of suitable casting solvents include dimethyl carbonate, diethyl carbonate, dimethylformamide, dimethylacetamide, acetonitrile, etc. Further, it can be desirable to remove the reaction solvent used for form partially crosslinked reaction product, for example by heating and/or using a gas such as nitrogen (e.g., purging or bubbling the gas through the reaction mixture), so that the partially crosslinked reaction product is in solution in the casting solvent. The casting solvent and the partially crosslinked reaction product are then applied to a substrate, which is subsequently air-dried to remove the casting solvent and form a coating of the partially crosslinked reaction product on the substrate. The dried coating is then cured as described above to form the thermoset omniphobic composition coating on the substrate. In most cases, the cured thermoset remains as a coating on the substrate to provide omniphobic properties to the substrate. In some embodiments, the cured thermoset can be deliberately peeled or otherwise removed from the substrate to provide a standalone composition in the form or a free film or other coating. The coating can be applied using any suitable method, such as by casting, spraying, rolling and/or dipping.

In an embodiment, curing the partially crosslinked reaction product includes applying the partially crosslinked reaction product to a substrate such as the channel wall 200 inner surface 202 (e.g., applied as dissolved/dispersed in its original reaction medium or reaction solvent, without solvent exchange/addition with a casting solvent). The coated substrate is then dried (e.g., to remove the reaction solvent) to form a coating of the partially crosslinked reaction product on the substrate. The dried coating is then cured as described above to form the thermoset omniphobic composition coating on the substrate.

Figure 7:
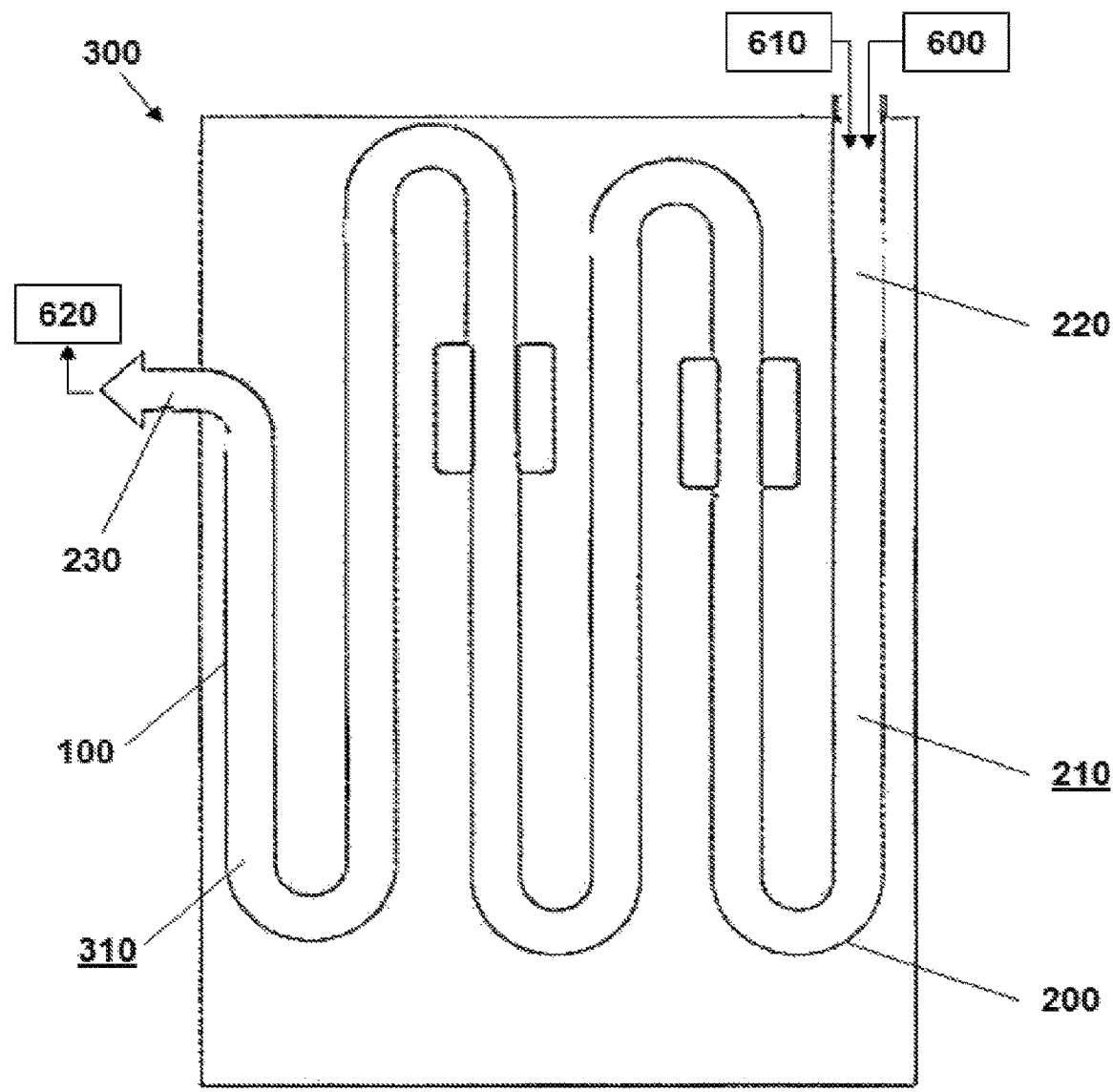
FIG. 7 illustrates a method for forming a coated channel according to the disclosure.

FIG. 7 illustrates a method for forming a coated channel 300 according to the disclosure using the various methods described above for forming the thermoset omniphobic composition 100 in a particular context where the coated substrate is the inner surface 202 of the channel wall 200. In general, three components including the first thermosetting component, the second thermosetting component, and the functionalized omniphobic polymer are delivered to an interior volume 210 defined by the channel wall 200. The interior volume 210 generally corresponds to the eventual channel interior volume 310 prior to the formation of the composition 100 coating. In some embodiments, the three composition 100 components are partially crosslinked or otherwise pre-reacted when introduced into the channel volume 210. As introduced into the channel volume 210, the composition 100 components are in contact with the inner surface 202, generally in the form of a thin (liquid) film, such as a film having a thickness corresponding to the eventual composition 100 coating thickness. The three composition 100 components are then cured on the inner surface 202 to form the thermoset omniphobic composition 100 as a coating on the inner surface 202 of the channel wall 200. In an embodiment, the three composition 100 components along with any desired fillers or additives (described above) can be mixed and pre-reacted, such as in an external reaction vessel (not shown), to from the partially crosslinked reaction product, which is then delivered to the channel volume 210 for subsequent final curing to form the final composition 100. In another embodiment, the first and second thermosetting components along with any desired fillers or additives (described above) can be mixed and delivered to the channel volume 210 where they are reacted to partially cure the first and second thermosetting components. The functionalized omniphobic polymer is subsequently delivered to the interior volume 210 and reacted with the partially cured first and second thermosetting components to form a corresponding partially crosslinked reaction product between the three composition 100 components. Subsequent final curing forms the final composition 100. Such a two-step/two-layer process can improve adhesion between the thermoset omniphobic composition 100 and the channel wall 200.

In an embodiment, the three composition 100 components can be delivered to the interior volume 210, and then a gas flow is delivered through the interior volume 210. For example, the three composition 100 components in liquid form can be poured, pumped, etc. into the volume 210 to flood or at least partially fill the volume 210. The gas flow is generally applied under positive pressure, such as pressurized air, thereby expelling at least some composition 100 components from the channel and leaving at least some composition 100 components as a coating on the interior channel surface 202 to be subsequently cured to form the final composition 100 coating. In an alternative embodiment, a suction or negative pressure can be applied to the volume 210 with the composition 100 components therein. This similarly removes some composition 100 components from the channel and leaves at least some composition 100 components as a coating on the interior channel surface 202 to be subsequently cured to form the final composition 100 coating. In another embodiment, gravity-driven draining of the volume 210 can be used similarly to the positive and negative pressure techniques to leave an interior surface coating for subsequent curing. These process cycles can be repeated if desired, for example to increase overall coating thickness and/or cover interior surface regions that might have been left uncoated in previous coating application(s).

In some embodiments, the channel wall 200, in particular its inner surface 202, can be cleaned or otherwise surface-treating prior to introducing the composition 100 components. Such pre-treatment can improve adhesion between the interior channel surface 202 and the eventual thermoset omniphobic composition 100 coating. For example, metal channel surfaces can be treated with etching chemicals such as hydrogen fluoride to make the surface polar and create surface holes or pores (e.g., a porous surface layer) to facilitate better adhesion between the omniphobic coating and metal channel sidewall. Similarly, plastic channel surfaces can be subjected to plasma treatment to increase surface polarity and omniphobic coating adhesion. Phosphatization can also be used to increase the surface polarity before applying the omniphobic coating.

EXAMPLES

The examples illustrate the disclosed articles, compositions, and methods, but are not intended to limit the scope of any claims thereto. In the examples, thermoset omniphobic compositions generally according to the disclosure are described for application as a coating on a fluid flow channel. The applied films or coatings can then be evaluated according to a variety of tests as described below in order to characterize their relative degree of omniphobicity.

Figure 1:
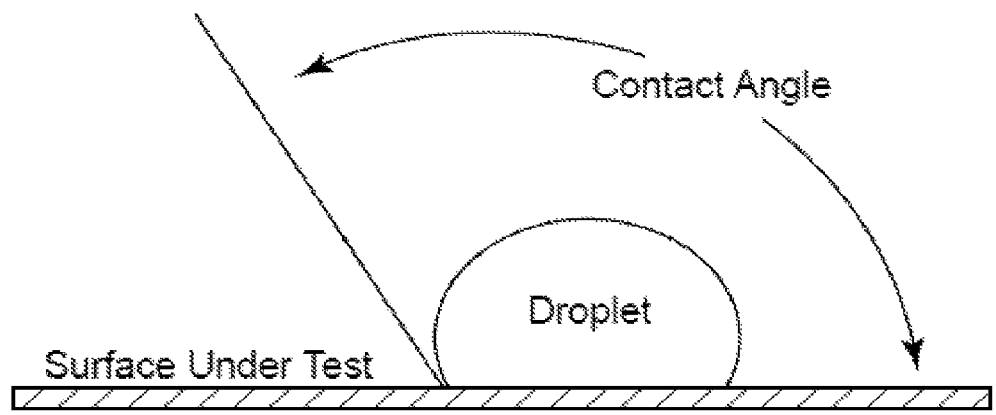
FIG. 1 is a diagram illustrating measurement of a contact angle for a liquid droplet on a surface.
Figure 2:
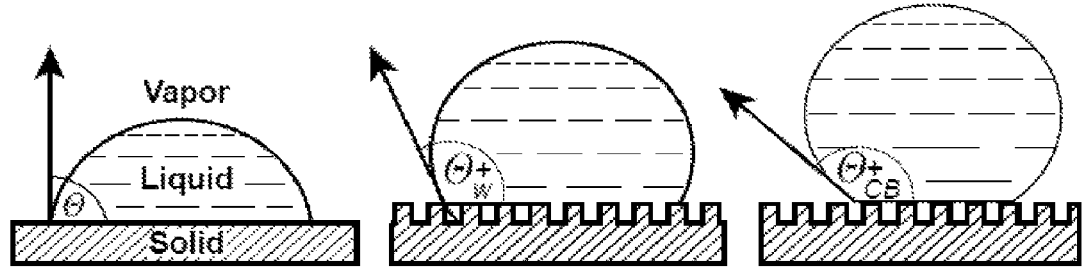
FIG. 2 is a diagram illustrating how contact angles for a given liquid droplet on a surface can vary as a function of surface topology (e.g., flat or smooth surface vs. textured surfaces).

Contact Angle:

Contact angles (see FIG. 1) are determined by applying a liquid droplet on a test coating surface that is stationary and horizontal with respect to gravity. Any specified liquids can be used, but omniphobic coatings are generally characterized by determining contact angles for water droplets and separately for oil droplets (e.g., a cooking or other common vegetable oil, hexadecane or other oily liquid hydrocarbon). The applied droplets have a volume of about 5 µl (e.g., about 3 μl to 10 μl), although the measured contact angle is not particularly sensitive to actual droplet volume in these ranges. Once applied to the test coating, the droplet can be visually interrogated through any suitable means to determine the contact angle (e.g., using conventional digital image photography and digital image analysis). Suitably, (cured) omniphobic composition coatings according to the disclosure have a water contact angle in a range from 90° to 120° (e.g., at least 90°, 95°, 100°, or 105° and/or up to 110°, 115°, or 120°). Suitably, (cured) omniphobic composition coatings according to the disclosure have an oil contact angle in a range from 0° or 1° to 65° (e.g., at least 1°, 10°, 20°, or 30° and/or up to 40°, 50°, 60°, or 65°).

Sliding Angle:

Sliding angles are determined by applying a liquid droplet on a test coating surface that is initially horizontal with respect to gravity. The test coating surface is then gradually ramped at a controlled/known angle relative to the horizontal plane. Droplets which do not initially spread will remain stationary on the test surface until the test surface is ramped to a sufficiently high angle to cause the droplets to slide down the ramped test surface. The test surface angle at which sliding begins is the sliding angle of the test coating. Any specified liquids can be used, but omniphobic coatings are generally characterized by determining contact angles for water droplets and separately for oil droplets (e.g., a cooking or other common vegetable oil, hexadecane or other oily liquid hydrocarbon). The applied droplets have a specified volume, which is generally about 75 μl (e.g., about 50 μl to 150 μl) for water and about 20 μl (e.g., about 5 μl to 40 μl) for oil. Once applied to the test coating, the droplet can be visually interrogated through any suitable means to determine the sliding angle (e.g., using conventional digital image photography and digital image analysis). Suitably, (cured) omniphobic composition coatings according to the disclosure have a water sliding angle in a range from 0° or 1° to 30° (e.g., at least 1°, 2°, 4°, 6°, or 8° and/or up to 10°, 15°, 20°, or 30°). Suitably, (cured) omniphobic composition coatings according to the disclosure have an oil contact angle in a range from 0° or 1° to 20° (e.g., at least 1°, 2°, 4°, 6°, or 8° and/or up to 10°, 12°, 15°, or 20°).

Scratch Resistance:

Scratch resistance is evaluated on a scale of 1 (worst) to 10 (best) by attempting to scratch a test coating surface using materials of various hardness, such as a human fingernail, the corner/edge of a glass slide, a metal (e.g., stainless steel) knife, etc. The test surface is rated as "1" for a given scratching material if there is substantial damage or delamination of the test coating surface after being scratched. The test surface is rated as "10" for a given scratching material if there is no observable damage or marking on the test coating surface after being scratched. These qualitative numbers were obtained based on the criteria including: 1) the depth of the scratch, 2) is scratch damaging the surface, and 3) whether the scratch be felt if touched by hand.

Example 1—Omniphobic Urethane and Epoxy Channel Coatings

Example 1 provides illustrative channels with omniphobic composition coatings according to the disclosure. Thermoset polyurethane or epoxy omniphobic coating components are generally applied to a channel surface, and then the components are cured to form a thermoset omniphobic composition as a coating thereon.

Omniphobic urethane composition: An omniphobic urethane composition can be formed by mixing 1880 mg acrylic polyol CC939 (available from Sherwin-Williams) and 1 mL solvent/reducer (US3; mixture of 2-btuanone, 2-pentanone, ethoxy propionate, and n-butyl acetate; Sherwin-Williams). Then, 50 mg of bis-(3-aminopropyl)-terminated polydimethylsiloxane (PDMS-NH2-2.5K, Mn=2500 g/mol, mono-amino-terminated, Sigma-Aldrich) dissolved in 0.1 mL of solvent (US3) is added drop wisely into the polyol/reducer mixture. Then to this solution, 470 mg hexamethylene diisocyanate trimer (HDIT; UH80, Sherwin-William) dissolved in 0.9 mL of solvent (US3) is added drop wisely into it under continuous stirring. The resulting mixture is stirred for 5 min, followed by the addition of a tin(II) catalyst dissolved in 0.1 mL of solvent (US3), and then stirred further for 2-6 hr at room temperature.

Omniphobic epoxy composition: An omniphobic epoxy composition can be formed by adding 50 mg isocyanate-terminated PDMS (PDMS-NCO-2.5K; Mn=2500 g/mol, Sigma-Aldrich) very slowly to 0.72 g of poly (propylene glycol) bis(2-aminopropyl ether). Then 2 g of bisphenol A diglycidyl ether is added, and the solution is diluted by adding 4 ml of THF solvent. The solution is stirred at 60° C. for 2 hours and then cooled to room temperature.

Positive pressure method for forming a coated channel: An omniphobic composition according to the disclosure, for example an omniphobic urethane composition or omniphobic epoxy composition as described above can be used to form a coated fluid channel according to the disclosure with the application of positive pressure, for example with blown air or other gas(es). With reference to FIG. 7, an omniphobic composition coating solution 600 as described above (e.g., partially cured or uncured) can be poured or otherwise delivered to the interior volume 210 of the channel 200 via an inlet 220. Pressurized air or other gas is flowed into the channel 200 via an air valve 610 also connected to the inlet 220 where the coating solution 600 is delivered to circulate through the complex channels 200. The air or gas pressure flushes out excess coating solution 600 through an outlet 230 of the channel 200. The absence further splashing or other exit of the coating solution 600 indicates that excess coating solution 600 has been removed, thereby leaving a (thin) coating film on the interior channel surface 202 and a void volume 310 for fluid flow in the eventual cured article. The coated channel 200 samples are then cured at ambient or elevated temperature to provide the coated channel 300 including the thermoset omniphobic composition 100 as an internal coating on the channel sidewall 200.

Negative pressure method for forming a coated channel: An omniphobic composition according to the disclosure, for example an omniphobic urethane composition or omniphobic epoxy composition as described above can be used to form a coated fluid channel according to the disclosure with the application of negative pressure, for example via suction. With reference to FIG. 7, an omniphobic composition coating solution 600 as described above (e.g., partially cured or uncured) can be poured or otherwise delivered to the interior volume 210 of the channel 200 via an inlet 220. The inlet 220 can then be sealed, for example with a stopper or other seal to prevent further gas/liquid inflow into the channel 200. Negative pressure is applied to the channel 200 via a vacuum or other suction device 620 connected to the outlet 230 to withdraw coating solution 600 by circulating it through the complex channels 200. Similar to above, the suction removes excess coating solution 600 from the channel 200, thereby leaving a (thin) coating film on the interior channel surface 202 and a void volume 310 for fluid flow in the eventual cured article. The coated channel 200 samples are then cured at ambient or elevated temperature to provide the coated channel 300 including the thermoset omniphobic composition 100 as an internal coating on the channel sidewall 200.

In either approach, the coating thicknesses on the inner channels can be controlled by the by the concentration of the coating solution, suction power of the pump, air pressure, delay time for the suction, and/or air pressure, for example. Coated and uncoated water channels can be are connected to the same water connection operated in parallel for different periods of time to compare performance, for example with respect to corrosion resistance, pressure drop, etc.

Example 2—Omniphobic Urethane and Epoxy Surface-Modified Channel Coatings

Example 2 provides illustrative channels with omniphobic composition coatings according to the disclosure. Thermoset polyurethane or epoxy coating components are generally applied to a channel surface and partially cured. A functionalized omniphobic component is applied to the partially cured surface, and then the composition is fully cured to form a thermoset omniphobic composition as a coating thereon, in particular with the omniphobic portion of the coating being primarily localized on an external surface (e.g., fluid-contacting surface) of the coating.

Omniphobic urethane composition: A surface-modified omniphobic urethane composition can be formed by the following procedure. The interior surface 202 of a channel 200 mold is cleaned and treated prior to application of coating solution 600 components. For example, interior mold/channel surfaces 202 are thoroughly scrubbed with a cleaning solution such as BONDERITE C-IC 33 AERO (phosphoric acid-based cleaner; Henkel) for 5 min, rinsed three times with tap water, rinsed three times with distilled water, rinsed with acetone, and then rinsed with hexane. The cleaned and rinsed surfaces are dried for 20 min. A urethane coating solution 600 is then filled/applied to the channel 200, suitably within two hours of cleaning. The coating solution 600 includes a polyisocyanate and a polyol as first and second theromosetting components, respectively. Excess urethane coating solution 600 is drained or otherwise removed from the channel 200 (e.g., via the methods in Example 1), thereby leaving a (thin) coating film on the interior channel surface 202 and a void volume 310 for fluid flow in the eventual cured article. The coating film can be cured at room temperature for 1.5 hr. Once the initial coating becomes tack-free, a functionalized omniphobic polymer (e.g., PDMS-NH2 as in Example 1; such as 3 wt. % solution in hexane) solution can be applied to the channel to coat the initial (partially) cured product between the polyisocyanate and polyol. Excess functionalized omniphobic polymer solution is drained, then the channel 200 is allowed to cure at ambient conditions 48 hours to react the amino-functional omniphobic polymer with unreacted —NCO groups in the initial product, thereby forming the coated channel 300 including the thermoset omniphobic composition 100 as an internal coating on the channel sidewall 200. An example formulation for forming a thermoset urethane composition with an omniphobic surface modification is provided in Table 1 below.

TABLE 1

Surface-Modified Thermoset Urethane for Example 2

| | Component | Product | Amount | Sub Total | Wt. Fraction |
|---|---|---|---|---|---|
| #1 | Acrylic Polyol Resin | G-CURE 27-1092 | 50 | 57.6 | 0.49 |
| | Surface Tension reducing Agent | BYK 320 | 0.1 | | 0.001 |
| | Dispersing Aid | BYK 220S | 2.5 | | 0.02 |
| | Adhesion Promotor | BYK 4510 | 5 | | 0.05 |
| #2 | Titanium Dioxide | R-900 | 12 | 15 | 0.12 |
| | Corrosion Inhibitor | ZPA | 3 | | 0.030 |
| #3 | Polymeric Isocyanate | DESMODUR N3200 | 13.725 | 28.725 | 0.135 |
| | Solvent | Acetone | 15 | | 0.15 |
| | Total | | 101.325 | 101.325 | 1.00 |

Omniphobic epoxy composition: A surface-modified omniphobic epoxy composition can be formed by the following procedure. The interior surface 202 of a channel 200 mold is cleaned and treated prior to application of coating solution 600 components, for example using the process above for the omniphobic urethane composition. An epoxy coating solution 600 is then filled/applied to the channel 200, suitably within two hours of cleaning. The coating solution 600 can include a polyepoxide and an amine or amide as first and second theromosetting components. Excess epoxide coating solution 600 is drained or otherwise removed from the channel 200 (e.g., via the methods in Example 1), thereby leaving a (thin) coating film on the interior channel surface 202 and a void volume 310 for fluid flow in the eventual cured article. The coating film can be cured at 80° C. for 15 min. Once the initial coating becomes tack-free, a functionalized omniphobic polymer (e.g., PDMS-NCO as in Example 1; such as 3 wt. % solution in hexane) solution can be applied to the channel to coat the initial (partially) cured epoxide product. Excess functionalized omniphobic polymer solution is drained, then the channel 200 is allowed to cure at ambient conditions 48 hours to react the NCO-functional omniphobic polymer with unreacted functional groups in the initial product, thereby forming the coated channel 300 including the thermoset omniphobic composition 100 as an internal coating on the channel sidewall 200. An example formulation for forming a thermoset epoxy composition with an omniphobic surface modification is provided in Table 2 below.

TABLE 2

Surface-Modified Thermoset Epoxy for Example 2

| | Component | Product | Amount (g) | |
|---|---|---|---|---|
| #1 | Epoxy resin | EPON 828 | 50.00 | 50.00 |
| | Surface Tension Reducing Agent | BYK 320 | 0.74 | |
| | Dispersing Aid | BYK 220S | 4.20 | |
| | Adhesion Promotor | BYK 24510 | 5.00 | |
| #2 | Titanium Dioxide | R-900 | 12.00 | 12.00 |
| | Corrosion Inhibitor | ZPA | 3.00 | |
| #3 | Amine curing agent | ANCAMIDE 2445 | 39.89 | 39.89 |
| | Solvent | Acetone | 10.00 | |
| | | Total | 124.83 | 124.83 |

Because other modifications and changes varied to fit particular operating requirements and environments will be apparent to those skilled in the art, the disclosure is not considered limited to the example chosen for purposes of illustration, and covers all changes and modifications which do not constitute departures from the true spirit and scope of this disclosure.

Accordingly, the foregoing description is given for clearness of understanding only, and no unnecessary limitations should be understood therefrom, as modifications within the scope of the disclosure may be apparent to those having ordinary skill in the art.

All patents, patent applications, government publications, government regulations, and literature references cited in this specification are hereby incorporated herein by reference in their entirety. In case of conflict, the present description, including definitions, will control.

Throughout the specification, where the compositions, processes, kits, or apparatus are described as including components, steps, or materials, it is contemplated that the compositions, processes, or apparatus can also comprise, consist essentially of, or consist of, any combination of the recited components or materials, unless described otherwise. Component concentrations can be expressed in terms of weight concentrations, unless specifically indicated otherwise. Combinations of components are contemplated to include homogeneous and/or heterogeneous mixtures, as would be understood by a person of ordinary skill in the art in view of the foregoing disclosure.

What is claimed is:

1. An omniphobically coated fluid channel comprising:
   a channel comprising at least one sidewall defining an interior channel surface and a flow volume, wherein the channel is adapted to permit fluid flow through the flow volume; and
   a thermoset omniphobic composition as a coating on the interior channel surface, the thermoset omniphobic composition comprising:
      a thermoset polymer comprising a crosslinked backbone, the crosslinked backbone comprising:
         (i) first backbone segments having a structure corresponding to a reaction product from at least one first thermosetting component reactive with at least one of a second thermosetting component and a functionalized omniphobic polymer having a glass transition temperature ($T_g$) of 70° C. or less,
         (ii) second backbone segments having a structure corresponding to a reaction product from at least one first thermosetting component reactive with at least one of a second thermosetting component and a functionalized omniphobic polymer having a glass transition temperature ($T_g$) of 70° C. or less,
         (iii) third backbone segments having a structure corresponding to a reaction product from at least one second thermosetting component reactive with the first thermosetting component,
         (iv) first linking groups linking the first backbone segments and the third backbone segments, and
         (v) second linking groups linking the first backbone segments and the second backbone segments.

2. The omniphobically coated fluid channel of claim 1, wherein the channel comprises a metal.

3. The omniphobically coated fluid channel of claim 2, wherein the metal is selected from aluminum, copper, steel, cast iron, alloys thereof, and combinations thereof.

4. The omniphobically coated fluid channel of claim 1, wherein the coating of the thermoset omniphobic composition has a thickness ranging from 0.01 µm to 100 µm.

5. The omniphobically coated fluid channel of claim 1, wherein the channel has a characteristic length dimension perpendicular to a direction of flow through the flow volume in a range from 0.2 cm to 200 cm.

6. The omniphobically coated fluid channel of claim 1, wherein
   the first linking groups have a structure corresponding to a reaction product of a first functional group of the first thermosetting component and a second functional group of the second thermosetting component, and
   the second linking groups have a structure corresponding to a reaction product of the first functional group of the first thermosetting component and a third functional group of the functionalized omniphobic polymer.

7. The omniphobically coated fluid channel of claim 1, wherein the first functional group, the second functional group, and the third functional group are different from each other.

8. The omniphobically coated fluid channel of claim 7, wherein the first and third functional groups have a higher reaction rate with each other relative to the first and second functional groups with each other.

9. The omniphobically coated fluid channel of claim 1, wherein the thermoset omniphobic composition has a homogeneous structure.

10. The omniphobically coated fluid channel of claim 1, wherein the thermoset omniphobic composition has a heterogeneous structure.

11. The omniphobically coated fluid channel of claim 1, wherein the second backbone segments are present in an amount ranging from 0.01 wt. % to 20 wt. % relative to the thermoset polymer.

12. The omniphobically coated fluid channel of claim 1, wherein the functional group of the functionalized omniphobic polymer is selected from the group consisting of epoxide groups, amino groups, hydroxyl groups, carboxylic groups, isocyanate groups, and combinations thereof.

13. The omniphobically coated fluid channel of claim 1, wherein the functionalized omniphobic polymer is selected from the group consisting of functionalized polysiloxanes, functionalized polyperfluoroethers, functionalized polybutadienes, functionalized polyisobutenes, functionalized branched polyolefins, functionalized low molecular weight polyolefins, functionalized poly(meth)acrylates, and combinations thereof.

14. The omniphobically coated fluid channel of claim 1, wherein the functionalized omniphobic polymer comprises a mono-functional functionalized omniphobic polymer.

15. The omniphobically coated fluid channel of claim 1, wherein the functionalized omniphobic polymer comprises a di-functional functionalized omniphobic polymer.

16. The omniphobically coated fluid channel of claim 1, wherein the functionalized omniphobic polymer comprises a poly-functional functionalized omniphobic polymer.

17. The omniphobically coated fluid channel of claim 1, wherein the functionalized omniphobic polymer has a glass transition temperature in a range from −150° C. to 70° C.

18. The omniphobically coated fluid channel of claim 1, wherein the functionalized omniphobic polymer is a liquid at a temperature in a range from 10° C. to 40° C.

19. The omniphobically coated fluid channel of claim 1, wherein the functionalized omniphobic polymer has a molecular weight ranging from 300 to 50,000 g/mol.

20. The omniphobically coated fluid channel of claim 1, wherein the first thermosetting component and the second thermosetting component together correspond to a thermoset polyurethane.

21. The omniphobically coated fluid channel of claim 1, wherein:
the first thermosetting component comprises a polyisocyanate or a polyol; and
the second thermosetting component comprises the other of the polyisocyanate and the polyol.

22. The omniphobically coated fluid channel of claim 21, wherein:
the first thermosetting component comprises the polyisocyanate, and the first functional group of the first thermosetting component comprises an isocyanate group;
the second thermosetting component comprises the polyol, and the second functional group of the second thermosetting component comprises a hydroxyl group; and
the third functional group of the functionalized omniphobic polymer comprises an amino group or a hydroxyl group.

23. The omniphobically coated fluid channel of claim 21, wherein the polyisocyanate is selected from the group consisting of 1,5-naphthylene diisocyanate, 4,4'-diphenylmethane diisocyanate (MDI), hydrogenated MDI, xylene diisocyanate (XDI), tetramethylxylol diisocyanate (TMXDI), 4,4'-diphenyl-dimethylmethane diisocyanate, di- and tetraalkyl-diphenylmethane diisocyanate, 4,4'-dibenzyl diisocyanate, 1,3-phenylene diisocyanate, 1,4-phenylene diisocyanate, one or more isomers of tolylene diisocyanate (TDI), 1-methyl-2,4-diiso-cyanatocyclohexane, 1,6-diisocyanato-2,2,4-trimethyl-hexane, 1,6-diisocyanato-2,4,4-trimethylhexane, 1-iso-cyanatomethyl-3-isocyanato-1,5,5-trimethylcyclohexane, chlorinated and brominated diisocyanates, phosphorus-containing diisocyanates, 4,4'-diisocyanatophenyl-perfluoroethane, tetramethoxybutane 1,4-diisocyanate, butane 1,4-diisocyanate, hexane 1,6-diisocyanate (HDI), HDI dimer (HDID), HDI trimer (HDIT), HDI biuret, 1,5-pentamethylene diisocyanate (PDI), PDID (dimer of PDI), PDIT (trimer of PDI), PDI biuret, dicyclohexylmethane diisocyanate, cyclohexane 1,4-diisocyanate, ethylene diisocyanate, phthalic acid bisisocyanatoethyl ester, 1-chloromethylphenyl 2,4-diisocyanate, 1-bromomethylphenyl 2,6-diisocyanate, 3,3-bischloromethyl ether 4,4'-diphenyldiisocyanate, trimethylhexamethylene diisocyanate, 1,4-diisocyanato-butane, 1,2-diisocyanatododecane, a polyurethane prepolymer diisocyanate, and combinations thereof.

24. The omniphobically coated fluid channel of claim 21, wherein the polyol is selected from the group consisting of polyether polyols, hydroxlated (meth)acrylate oligomers, glycerol, ethylene glycol, diethylene glycol, triethylene glycol, tetraethylene glycol, propylene glycol, dipropylene glycol, tripropylene glycol, 1,3-propanediol, 1,3-butanediol, 1,4-butanediol, neopentyl glycol, 1,6-hexanediol, 1,4-cyclohexanedimethanol, glycerol, trimethylolpropane, 1,2,6-hexanetriol, pentaerythritol, (meth)acrylic polyols, isosorbide, and combinations thereof.

25. The omniphobically coated fluid channel of claim 1, wherein the first thermosetting component and the second thermosetting component together correspond to a thermoset epoxy.

26. The omniphobically coated fluid channel of claim 1, wherein:
the first thermosetting component comprises a polyepoxide or an amine or amide; and
the second thermosetting component comprises the other of the polyepoxide and the amine or amide.

27. The omniphobically coated fluid channel of claim 26, wherein:
the first thermosetting component comprises the amine, and the first functional group of the first thermosetting component comprises an amino group or an amide group;
the second thermosetting component comprises the polyepoxide, and the second functional group of the second thermosetting component comprises an epoxide group; and
the third functional group of the functionalized omniphobic polymer comprises an isocyanate group.

28. The omniphobically coated fluid channel of claim 26, wherein the polyepoxide is selected from the group consisting of polyepoxide-substituted aromatic hydrocarbons, aliphatic hydrocarbons, cycloaliphatic hydrocarbons, ethers thereof, esters thereof, imines thereof, and combinations thereof.

29. The omniphobically coated fluid channel of claim 26, wherein the amine is selected from the group consisting of polyamine-substituted aromatic hydrocarbons, aliphatic hydrocarbons, cycloaliphatic hydrocarbons, ethers thereof, esters thereof, imines thereof, and combinations thereof.

30. The omniphobically coated fluid channel of claim 1, wherein the first thermosetting component and the second thermosetting component together correspond to an acrylic thermoset.

31. The omniphobically coated fluid channel of claim 1, wherein the first backbone segments are present in the thermoset polymer in an amount ranging from 10 wt. % to 90 wt. % relative to the thermoset polymer.

32. The omniphobically coated fluid channel of claim 1, wherein the second backbone segments are present in the thermoset polymer in an amount ranging from 0.2 wt. % to 8 wt. % relative to the thermoset polymer.

33. The omniphobically coated fluid channel of claim 1, wherein the third backbone segments are present in the thermoset polymer in an amount ranging from 10 wt. % to 90 wt. % relative to the thermoset polymer.

34. The omniphobically coated fluid channel of claim 1, wherein the thermoset omniphobic composition further comprises one or more additives selected from the group consisting of nanoclay, graphene oxide, graphene, graphite, silsesquioxane, silicon dioxide, aluminum oxide, cellulose nanocrystals, carbon nanotubes, zirconia, titanium dioxide, diatomaceous earth, biocides, pigments, dyes, thermoplastics, and combinations thereof.

35. The omniphobically coated fluid channel of claim 1, wherein the thermoset omniphobic composition has a water contact angle in a range from 90° to 120°.

36. The omniphobically coated fluid channel of claim 1, wherein the thermoset omniphobic composition has an oil contact angle in a range from 1° to 65°.

37. The omniphobically coated fluid channel of claim 1, wherein the thermoset omniphobic composition has a water sliding angle in a range from 1° to 30° for a 75 µl droplet.

38. The omniphobically coated fluid channel of claim 1, wherein the thermoset omniphobic composition has an oil sliding angle in a range from 1° to 20° for a 25 µl droplet.

39. The omniphobically coated fluid channel of claim 1, wherein:
the thermoset omniphobic composition has a composite structure comprising: (i) a solid matrix comprising the first backbone segments and the third backbone segments; and (ii) liquid nanodomains comprising the second backbone segments;
the liquid nanodomains have a size of 80 nm or less; and
the liquid nanodomains are (i) distributed throughout the solid matrix or (ii) substantially only occupy a thin surface layer.

40. A heat transfer apparatus comprising:
an omniphobically coated fluid channel according to claim 1;
a fluid source in fluid communication with the omniphobically coated fluid channel and adapted to deliver fluid through the flow volume thereof; and
a means for controlling the temperature of fluid delivered through the omniphobically coated fluid channel.

41. The apparatus of claim 40, wherein the means for controlling temperature comprises a cooler.

42. The apparatus of claim 40, wherein the means for controlling temperature comprises a heater.

43. A method for delivering a fluid through a channel, the method comprising:
providing an omniphobically coated fluid channel according to claim 1;
flowing a fluid through the flow volume of the omniphobically coated fluid channel.

44. The method of claim 43, wherein the fluid comprises liquid water.

45. A method for forming an omniphobically coated fluid channel, the method comprising:
(a) providing a channel comprising at least one sidewall defining an interior channel surface and a flow volume, wherein the channel is adapted to permit fluid flow through the flow volume;
(b) reacting (i) at least one first thermosetting component comprising a first functional group reactive with a second thermosetting component comprising a second functional group and a functionalized omniphobic polymer comprising a third functional group and having a glass transition temperature ($T_g$) of 70° C. or less, (ii) at least one functionalized omniphobic polymer comprising the third functional group and having a glass transition temperature ($T_g$) of 70° C. or less, and (iii) at least one second thermosetting component comprising the second functional group, to form a partially crosslinked reaction product;
(c) delivering the components (i), (ii), and (iii), optionally in the form of the partially crosslinked reaction product, to the flow volume of the channel and in contact with the interior channel surface; and
(d) curing the partially crosslinked reaction product to form the thermoset omniphobic composition as a coating on the interior channel surface.

46. The method of claim 45, further comprising adding to the components (i), (ii), and (iii) one or more additives selected from the group consisting of nanoclay, graphene oxide, graphene, graphite, silicon dioxide, aluminum oxide, cellulose nanocrystals, carbon nanotubes, zirconia, titanium dioxide, diatomaceous earth, biocides, pigments, dyes, thermoplastics, and combinations thereof.

47. The method of claim 45, wherein part (c) comprises delivering the components (i), (ii), and (iii) in the form of the partially crosslinked reaction product to the flow volume of the channel and in contact with the interior channel surface.

48. The method of claim 45, wherein part (c) comprises:
delivering the components (i) and (iii) to the flow volume of the channel and in contact with the interior channel surface;
reacting the components (i) and (iii) to partially cure the components;
delivering the component (ii) to the flow volume of the channel and in contact with the partially cured components (i) and (iii); and
reacting the component (ii) with the partially cured components (i) and (iii) to form the partially crosslinked reaction product on the interior channel surface.

49. The method of claim 45, wherein part (c) comprises:
at least partially filling the flow volume of the channel with the partially crosslinked reaction product; and
delivering a gas flow through the flow volume of the channel, thereby (i) expelling at least some partially crosslinked reaction product from the channel and (ii) leaving at least some partially crosslinked reaction product as a coating on the interior channel surface to be subsequently cured.

50. The method of claim 45, wherein part (c) comprises:
at least partially filling the flow volume of the channel with the partially crosslinked reaction product; and
applying a suction to the flow volume of the channel, thereby (i) expelling at least some partially crosslinked reaction product from the channel and (ii) leaving at least some partially crosslinked reaction product as a coating on the interior channel surface to be subsequently cured.

51. The method of claim 45, wherein part (c) comprises:
at least partially filling the flow volume of the channel with the partially crosslinked reaction product; and
draining the flow volume of the channel, thereby (i) expelling at least some partially crosslinked reaction product from the channel and (ii) leaving at least some partially crosslinked reaction product as a coating on the interior channel surface to be subsequently cured.

52. The method of claim 45, further comprising:
prior to delivering the components (i), (ii), and (iii) to the flow volume of the channel, surface-treating the interior channel surface to improve adhesion between the interior channel surface and the thermoset omniphobic composition coating.

* * * * *